US008178784B1

(12) United States Patent
Blackledge

(10) Patent No.: US 8,178,784 B1
(45) Date of Patent: May 15, 2012

(54) SMALL PINS AND MICROSCOPIC APPLICATIONS THEREOF

(76) Inventor: Charles Wesley Blackledge, Berlin (DE)

( * ) Notice: Subject to any disclaimer, the term of this patent is extended or adjusted under 35 U.S.C. 154(b) by 0 days.

(21) Appl. No.: 12/505,519

(22) Filed: Jul. 19, 2009

Related U.S. Application Data

(60) Provisional application No. 61/082,203, filed on Jul. 20, 2008.

(51) Int. Cl.
*H01R 4/00* (2006.01)
(52) U.S. Cl. .................................. 174/94 R; 174/128.2
(58) Field of Classification Search ................ 174/94 R, 174/128.2
See application file for complete search history.

(56) References Cited

U.S. PATENT DOCUMENTS

| 3,493,431 | A | 2/1970 | Wagner |
| 4,775,520 | A | 10/1988 | Unger |
| 5,445,011 | A | 8/1995 | Ghislain |
| 6,036,774 | A | 3/2000 | Lieber |
| 6,627,314 | B2 | 9/2003 | Matyjaszweski et al. |
| 6,656,573 | B2 | 12/2003 | Chen |
| 6,833,923 | B2 | 12/2004 | Florin et al. |
| 6,869,671 | B1 | 3/2005 | Crouse |
| 6,882,051 | B2 | 4/2005 | Majumdar |
| 7,105,052 | B1 | 9/2006 | Schlenoff |
| 7,105,428 | B2 | 9/2006 | Pan |
| 7,422,696 | B2 | 9/2008 | Mirkin |
| 7,449,237 | B2 | 11/2008 | Chan |
| 7,525,088 | B2 | 4/2009 | Botchway |
| 7,655,269 | B2 | 2/2010 | Mayer |
| 2002/0104762 | A1 | 8/2002 | Stonas |
| 2004/0095658 | A1 | 5/2004 | Buretea |
| 2005/0277205 | A1 | 12/2005 | Lee |
| 2006/0038990 | A1* | 2/2006 | Habib et al. .................. 356/301 |
| 2006/0270229 | A1 | 11/2006 | Corderman |
| 2007/0077429 | A1 | 4/2007 | Mirkin |
| 2008/0202579 | A1 | 8/2008 | Gur |

FOREIGN PATENT DOCUMENTS

| GB | 0416498.4 | 7/2004 |
| WO | WO 2006/008550 A1 | 1/2006 |

OTHER PUBLICATIONS

Guowen, Mang, et. al. "Ordered Ni nanowire tip arrays sticking out of the anodic aluminum oxide template," Journal of Applied Physics; published Mar. 1, 2005; vol. 97, 064303.
Burghard, Marko. "Asymmetric End-Functionalization of Carbon Nanotubes," Small; published Sep. 20, 2005; vol. 1, No. 12, 1148-1150.
Yu, Chenxu and Irudayaraj, Joseph. "Multiplex Biosensor Using Gold Nanorods," Analytical Chemistry; published Dec. 16, 2006; vol. 79, No. 2, 572-579.
Skinner, Kwan et. al. "Selective Functionalization of Arbitrary Nanowires," Nano Letters; published Nov. 2, 2006; vol. 6, No. 12, 2758-2762.
Sebastiano, Guerra. "Gold Nanorods: Functionalization and Applications." Unknown publisher; published Jun. 2007.

(Continued)

*Primary Examiner* — Chau Nguyen

(57) ABSTRACT

Pins comprising nanorods and attached members are provided. Two exemplary embodiments of pins are such that: the nanorod is partially embedded in the attached member; and one end of the nanorod is attached to the surface of the attached member. In some embodiments, the attached member is an optical handle. The use of the pin in a microscope to probe objects of interest is further provided, and enables a means of acquiring optical and topographical information about an object of interest.

19 Claims, 7 Drawing Sheets

OTHER PUBLICATIONS

Hurst, Sarah J. et. al. "Multisegmented One-Dimensional Nanorods Prepared by Hard-Template Synthetic Methods," Angewandte Chemie, published Mar. 29, 2006; vol. 45, No. 17, 2672-2692.

Lee, Seung Joon, et. al. "Hot Spots in silver nanowire bundles for surface-enhanced Raman spectroscopy," Journal of the American Chemical Society; published Jan. 26, 2006; vol. 128; pp. 2200-2201.

Lee, Seung Joon, et. al. "Supporting information: Hot Spots in silver nanowire bundles for surface-enhanced Raman spectroscopy," Journal of the American Chemical Society; published Jan. 26, 2006; vol. 128; pp. S1-S2.

Yao, J. L. et. al, "A complementary study of surface-enhanced Raman sattering and metal nanorod arrays," Pure Applied Chemistry; published in the year 2000; vol. 72; No. 1; pp. 221-228.

Al-Mawlawi, D. et. al, "Nanowires formed in anodic oxide nanotemplates," Journal of Materials Research; published Apr. 1994; vol. 9,; No. 4; pp. 1014-1018.

McMillan, B. G., et. al, "Reflectance and SERS from an ordered array of gold nanorods," Electrochimica Acta; published Feb. 25, 2007; vol. 53, pp. 1157-1163.

Stewart, Matthew E., et. al, "Nanostructured Plasmonic Sensors," Chemistry Reviews; published Jan. 30, 2008; vol. 108; No. 2; pp. 494-521.

Bauer, Laura Ann,, et. al, "Biological applications of high aspect ratio nanoparticles," Journal of Materials Chemistry; published Jan. 14, 2004; vol. 14; pp. 517-526.

Wang, Aijun A., et. al, "Controlled assembly of multi-segment nanowires by histidien-tagged peptides," Nanotechnology; ppublished Jun. 15, 2006; vol. 17; pp. 3375-3379.

Bauer, Laura Ann, et. al, "Selective functionalization of two-component magnetic nanowires," Langmuir; published Jul. 15, 2003; vol. 19; pp. 7043-7048.

Pearce, Megan E., et. al, "Multifunctional nanorods for biomedical appications," Pharmaceutical Research; published Dec. 2007; vol. 24; No. 12; pp. 2335-2352.

Salem, Aliasger K., et. al, "Directed assembly of multisegment Au/Pt/Au nanowires," Nano Letters; published May 11, 2004; vol. 4; No. 6; pp. 1163-1165.

Ikin, L., et. al, "Assembly and force measurement with SPM-like probes in holographic optical tweezers," New Journal of Physics; published Feb. 6, 2009; vol. 11; p. ID 023012 (8 pages).

Pollard, M. R., et. al, "Optically trapped probes with nanometer-scale tips for femto-Newton force measurement," New Journal of Phyiscs; published Nov. 30, 2010; vol. 12; p. ID 113056 (14 pages).

Kasim, Johnson, et. al, "Near-field Raman imaging sing optically trapped dielectric microsphere," Optics Express; published May 19, 2008; vol. 16; No. 11; pp. 7976-7984.

Rohrbach, Alexander, et. al. "Trapping and tracking a local probe with a photonic force microscope," Review of Scientific Instruments; published May 28, 2004; vol. 75; No. 6; pp. 2197-2210.

Dienerowitz, Maria, et. al, "Optical vortex trap for resonant confinement of metal nanoparticies," Optics Express; published Mar. 27, 2008; vol. 16; No. 7; pp. 4991-4999.

Pelton, Matthew, et. al, "Optical trapping and alignment of single gold nanorods by using plasmon resonances," Plasmonics: Metallic Nanostructures and their Optical Properties IV (Ed. Mark. I. Stockman), Proceedings of SPIE; vol. 6323; published Aug. 30, 2006; pp. 63230E-1 to 63230E-9.

* cited by examiner

SMALL PINS AND MICROSCOPIC APPLICATIONS THEREOF

CROSS-REFERENCE TO RELATED APPLICATIONS

This application claims the benefit of U.S. Provisional application 61/082,203, filed Jul. 20, 2008, entitled "Nanorods with Attached Handles and Microscopic Applications," which is incorporated herein by reference in its entirety.

FEDERALLY SPONSORED RESEARCH

None.

SEQUENCE LISTING

None.

BACKGROUND-FIELD OF INVENTION

This disclosure relates to a small particle, a pin, comprising a nanorod and an attached material. The attached material comprises a material with an index of refraction that is greater than zero. In microscopic applications, the attached material is sufficient to allow the pin to be held in an optical trap. In some embodiments, the pin is sufficient in size to greatly reduce the probability of other pins from being held in the optical trap.

A process of making pins is disclosed. Further disclosed is a method of using a pin in an apparatus to acquire optical signals that arise from the pin and its vicinity. A method of using a plurality of pins in an apparatus to acquire optical signals from a plurality of vicinities of the plurality of pins is also disclosed. The optical signals aid in determining or approximating one or more of: the presence, position, orientation, rates of motion, and optical properties of the pins, and furthermore aid in determining or approximating one or more of: the presence, composition (in whole or part), and properties of an analyte or plurality of analytes or object(s) of interest that is (are) in the vicinity of the pines) or become attached to the pines). The optical signals enable the collection of spectra from the vicinity of the pin. By scanning the pin near, over, or around an object of interest, at least one of the optical signals enables the acquisition of an image of the object of interest. The object(s) of interest may be, but is (are) not limited to be one or more of the following: a molecule, molecules, a cell, cells, a virus, viruses, and a surface.

BACKGROUND-PRIOR ART

1. Scanning probe microscopy (SPM) is a popular technique for high spatial resolution characterization of materials, with applications in the electronics industry, where the shrinking of feature sizes has reached the tens of nanometers, and in molecular biology, in which molecules like DNA and proteins with dimensions down to the single nanometer size can be individually imaged.

There are many different SPM methods that vary in utility and general applicability. For example, scanning tunneling microscopy (STM) is routinely capable of single atom resolution which is very useful, but it relies on a conductive substrate, so STM cannot be performed on nonconductive substrates. Existing scanning probe methods that rely on cantilevers which have much greater mass than a pin are limited in mechanical responsivity of the probe, and this often makes it difficult to image soft materials without causing damage to the sample. A few examples from the numerous patents that relate to the probe or scanning probe methods which rely on a probe with a cantilever, or "base" are U.S. Pat. No. 6,515,277 (Kley), and U.S. Pat. No. 6,369,379 (Kley).

Often, in scanning probe methods, a signal derived from the reflection of a laser beam from a surface of a cantilever is used to determine changes in the position of the probe. The signal is furthermore used to adjust the position of the probe with respect to a scanning stage, whereupon a sample is attached, during scanning and acquisition of an image. The reflection of the feedback laser from the cantilever is usually directed to a quadrant photo diode that provides a signal that depends on the deflection of the cantilever. The signal is subsequently filtered, often with a proportional-integral-gain type electronic filter, to provide a positioning signal that moves either the stage or the probe. As the probe scans in the x-y plane, features on the sample that push on the probe cause a deflection in the cantilever. When optical signals from the sample are desired, a laser beam that is used to provide a feedback signal often also provides an undesirable optical background signal that may overwhelm optical signals from the sample.

There are numerous publications and patents that describe how to control the properties of light and how to acquire optical signals, and these subjects are relevant to the acquisition of optical signals from the vicinity of a pin. U.S. Pat. Nos. 6,515,277 (Kley), 6,515,277 (Kley), and 6,515,277 (Kley) describe a scanning probe microscope assembly and method for making confocal, spectrophotometric, near-field, and scanning probe measurements and associated images.

Characterizing optical properties of samples as well as their topographical properties has utility. For example, near-field scanning optical microscopy (NSOM) has found applications in imaging small structures and is able to acquire both optical and topographical images simultaneously. Usually near-field scanning optical microscopy (NSOM) methods include using an optical fiber that is attached to a dithering, or vibrating, tuning fork. The amplitude of the vibrations of the tip is measured and provides the feedback signal. As the probe is scanned along a surface with topological features, the tip height above the sample is adjusted according to the mechanical damping of the vibration due to energy transfer to the object of interest. This dithering motion applies a shear force to the sample and can destroy delicate objects of interest. For example the lipid bilayers which surround cells can be destroyed by an NSOM probe. Sample damage induced by the probe onto the sample can occur for any direction of oscillatory motion of the probe. U.S. Pat. No. 6,703,614 (Stifter, et al.) describes an NSOM which relies on a cantilever based probe. In all scanning probe methods, a force arises between a probe and a sample, and in the case of fragile samples, the force can cause damage. NSOM has other disadvantages, such as low light throughput and fairly poor topographical resolution that results from an approximately 200 nm thick reflective coating that is required to keep light from leaking through the probe and compromising optical resolution.

The resolution limit of scanning probe microscopy is determined by the size of the probe and the size of the interaction region of the probe with the sample. Most variants of NSOM have disadvantages such as that the size of the NSOM probe is quite large, and light throughput is low. The topographical resolution is worse than other forms of SPM such as atomic force microscopy, or S™. Surfaces or objects that are attached to surfaces are characterized by SPM.

II. Amplification of the electric field of light at metal surfaces enhances infrared absorption, fluorescence, and Raman scattering of nearby molecules. Single molecule vibrational spectra have been obtained with surface and resonance enhanced Raman on metal nanoparticles, and metal particles enhance and amplify many optical transitions of nearby molecules (Kramer, A. et al. *Appl. Phys. Lett,* 80, 1652-1654 (2002), Emory, S. R. et al. *Anal. Chem.,* 69, 2631-2635 (1997)). Raman spectra have been taken of surfaces using apertureless near-field scanning optical microscopy (ANSOM) without any control of the optical characteristics of the probe other than coating it with metal (Hayazawa, N. et al. *J. Chem. Phys.,* 117, 1296-1301, (2002)), and phonon tuned ANSOM probes have shown to markedly amplify infrared absorption (Hillenbrand, R. et al. *Nature,* 418, 159-162 (2002)). ANSOM requires careful alignment of the tip of the scanning probe with a focused light beam. In the interest of enabling the search of prior art, ANSOM is often referred to by names comprising "tip-enhanced".

Plasmon tuned nanoshells (Oldenburg, S. L. et al. *J. Chem. Phys.,* 111, 4729 (1999)) have been shown to enhance Raman scattering as in U.S. Pat. No. 6,699,724, (West, et al.), however their use in scanning probe devices is limited due to their size. The radius of curvature of the nanoshells is larger than the tip of a scanning probe.

ANSOM techniques have been shown to be in some ways an improvement over aperture-based NSOM methods. However, ANSOM also has disadvantages associated with relying on cantilevers, as in U.S. Pat. No. 5,479,024, (Hillner, et al.). In U.S. Pat. No. 6,002,471 (Quake) an ANSOM is described which uses a cantilever based probe. A disadvantage that arises as a result of relying on cantilevers is that it is difficult to align a focused light source with the tip of the probe. Secondly, it is difficult for the alignment to be maintained throughout a time required for acquisition of an image, approximately five minutes.

III. The attachment of polymers to surfaces is described in U.S. Pat. No. 6,627,314 (Matyjaszewski, et al.), and U.S. Patent Application No. 20040095658, titled, "Nanocomposites," (Buretea, Mihai et al.), and is relevant to fabrication of the pin in that it describes how a polymer can be attached to a nanoparticle (U.S. Pat. No. 6,036,774, Lieber et al.). These references do not mention the use of such composites to attach polymers to nanorods.

IV. The formation of nanorods of various homogeneous or heterogeneous materials that can be used in the pin is part of the subject of U.S. Patent Application No. 20020104762, titled, "Methods for the manufacture of colloidal rod particles as nanobar codes," (Stonas, Walter et al.).

Descriptions of similar procedures for making nanorods (although they may be called "nanowires," and the authors in some cases make a distinction between "nanorod" and "nanowire") are in U.S. Patent Application No. 20040095658, entitled, "Nanocomposites," (Buretea, Mihai et al.), and U.S. Patent Application No. 20020104762, titled, "Methods for the manufacture of colloidal rod particles as nanobar codes," (Stonas, Walter et al.). Buretea et. al in U.S. Patent Application No. 20040095658, entitled, "Nanocomposites," uses the term, "nanowires" to name what are herein termed "nanorods."

Nanorods can be grown by electrochemical methods using templates, chemical vapor deposition, or solution chemistry (Wirtz, M. et al. *Adv. Mat.,* 15, 455-458, (2003); Link, S. et al. *Int. Rev. Phys. Chem.* 19, 409 (2000); Busbee, B. D. et al. *Adv. Mater.,* 15, 414-416 (2003), U.S. Pat. No. 6,656,573 (Chen, et al.)).

Herein, there is no substantial difference between what are called nanowires and nanorods in the prior art. There exists some discussion in prior art about the terms, "nanorod," and "nanowire," and in some publications they may specifically prefer using "nanowire" to describe what is described herein as a nanorod. A nanorod, defined herein, has approximate dimensions of: a width greater than 1 nanometer, a length greater than 2 nm, and an aspect ratio (length divided by width) greater than 2.

Applications in devices comprising optical trapping of nanorods that have handles attached to them are not found in the prior art. The attachment of handles to nanorods is not found in the prior art, although some prior art does describe nanorods that are substantially encapsulated with a second material. For example, a well-known synthesis results in gold nanorods substantially encapsulated by cetyltrimethylammonium bromide.

V. A scanning probe method that utilizes optically trapped dielectric micro spheres is disclosed in Johnson Kasim; Yu Ting; You Yu Meng; Liu Jin Ping; Alex See; Li Lain Jong; and Shen Ze Xiang "Near-field Raman imaging using optically trapped dielectric microsphere," 26 May 2008, Vol. 16, No. 11, *Optics Express.* Kasim et. al describe sub-diffraction scale resolution of Raman signals through the use of optically trapped dielectric micro spheres that are substantially optically transparent, and do not include metallic or semiconductor species. The article does not discuss the use of metal asperities on the trapped microspheres, or any enhancement of optical signal that would result from metallic particles. Greater signal would be desirable because it would allow detection of weaker Raman signals, as well as enable an increased image acquisition speed. The radius of the microspheres (1.5 micrometers) described by Kasim et. al is substantially larger than the tip radius of most scanning probes (approximately 10 nanometers); thus, topographical resolution, if it were attempted using an apparatus closely related to that of Kasm et. al, would not compare favorably with many scanning probe methods. Smaller micro spheres would possibly give greater spatial resolution, but the authors note that they are more difficult to optically trap.

An apparatus for imaging that relies on optically trapped dielectric micropheres or nanospheres is disclosed by Alexander Rohrbach; Christian Tischer; Dirk Neumayer; Ernst-Ludwig Florin; and Ernst H. K. Stelzer in, "Trapping and tracking a local probe with a photonic force microscope," June, 2004, Vol. 75, No. 6, *Review of Scientific Instruments.* A typical optical trap designed for a dielectric microsphere typically results in a trapping potential of around ten times the thermal energy at room temperature. A three dimensional optical trap is often modeled as a harmonic potential with three spring constants along the x, y, and z coordinates. Typically, the spring constants in the x and y directions (perpendicular to the direction of beam propagation) are higher than the spring constant in the z direction. Thus, the optical trap is not as strong in the z-direction. For example, like in Rohrbach et. al, a 1 micrometer diameter polystyrene microsphere can be held in an optical trap formed by an 80 milliwatt beam with spring constants along the x and y coordinate of approximate 200 piconewtons per micrometer. The spring constant along the z-direction is about one fourth of that. Rohrbach et. al describes "thermal noise imaging," in which a small dielectric sphere rattles around in the vicinity of an optical trap. The optical signals measured in the thermal noise imaging apparatus of Rohrbach et. al are used to build a topographical image of a sample. The thermal noise imaging apparatus utilizes substantially transparent particles, and for example, does not take advantage of enhanced field strengths of metal particles. As is the case for much of the state-of-the-art of apparatuses built with optical traps, the apparatus of Rohrbach et. al depends on a substantially transparent optically trapped probe that does not absorb much light. Absorption of light is undesirable in much of the prior art because it results in a strong scattering force on the particle. In many conditions described by prior art, trapping of highly absorbing species is difficult or impossible under the conditions used to form the optical trap.

It is well known that an optically trapped object experiences forces that cause the equilibrium position of the optically trapped object to be located farther along the propagation direction of the light from the focal point of the light. Absorption or scattering of photons by the optically trapped object cause this.

Descriptions of forming multiple optical traps so that multiple objects can be trapped are found in the prior art. For example, U.S. Pat. No. 5,935,507 (Morito et. al) describes multi-point laser trapping. U.S. Pat. No. 6,850,361 (Wendenburg et. al) describes a system for introducing optical tweezers and/or a treatment beam into a laser scanning microscope. A review of the state-of-the-art of optically trapping in 2004 is found in Neuman and Block; "Optical trapping," September 2004, Vol. 75, No. 9, *Review of Scientific Instruments*. Notably, in Neuman and Block, much of the discussion is for cases where objects of interest are attached to the handle, and this is not necessarily the case for many embodiments disclosed herein. Neuman and Block describe: several means of detecting the position or changes in the position of an optically trapped object; several means of controlling the position of the optically trapped object; an increase in lateral (a direction perpendicular to the z axis) stiffness of the optical trap as the handle is displaced axially (along the z-direction) from its equilibrium position.

VI. In the case of materials that absorb or scatter light strongly, three dimensional optical traps are difficult to make, and in many instances materials are too strongly absorbing to be held in a region of high light intensity. It is possible to optically trap metal nanoparticles in a region of minimum light intensity as in Maria Dienerowitz; Michael Mazilu; Peter J. Reece; Thomas F. Krauss; and Dholakia in "Optical vortex trap for resonant confinement of metal nanoparticles," 31 Mar. 2008, Vol. 16, No. 7, *Optics Express*, which describes optically trapping metal particles in Laguerre-Gaussian (LG) light fields. Dienerowitz describes a case where the metal particles must overcome a potential barrier that coincides with a region of high light intensity in order to reach an optically trapped position in the optical vortex trap of a local minimum of light intensity. This makes it difficult for metal particles that are initially outside of the trap to enter the trap. Furthermore, to take advantage of field enhancements by metal particles, it is desirable for the metal particles to be trapped in regions of relatively high intensity light, not in regions of minimal intensity.

In Pelton; Liu; Kim; Smith; Guyot-Sionnest; and Scherer, "Optical trapping and alignment of single gold nanorods by using plasmon resonances," Jul. 1, 2006, Vol. 31, No. 13, *Optics Letters*, the trapping times of metal particles are only on the order of seconds, using fairly high power, approximately 100 milliwatts of light. It is desirable to optically trap metal nanorods for greater durations of time.

Rod shaped objects including ones made of metal or semiconductors can be held in optical traps. The prior art often describes optical trapping of rod shaped semiconductors or metals in only two dimensions, and the scattering force that pushes the rod along the direction of beam propagation is too large for the particle to find a stable equilibrium position along the z-axis formed by the optical trap. The size of an optical trap formed by tightly focused light depends, but not exclusively, on the wavelength or wavelengths of light that are used, and the numerical aperature (NA) of the lens or objective used to focus the light. Typically, an ellipsoidally shaped optical trap is formed around the focal "point" of a light beam that is focused by an objective such that the long axis of the ellipsoid is parallel to the direction of propagation of the light. A nanorod, or at least part of the nanorod, is narrower than the width of the ellipsoid, thus two things result: the nanorod may randomly move around inside of the optical trap such that the precise control of its position is more difficult, and the size of the optical trap is sufficiently large such that more than one nanorod may be trapped. This is undesirable for applications or utilities that require precise control of position of a single nanorod.

An apparatus described by Toussaint; Liu; Pelton; Pesic; Guffey; Guyot-Sionnest; and N. F. Scherer in "Plasmon resonance-based optical trapping of single and multiple Au nanoparticles," 17 Sep. 2007, Vol. 15, No. 19, *Optics Express*, uses one laser to optically trap gold nanorods, and a second laser to probe them. Toussaint et at discloses a means of independently controlling the focus of the trap and probe beams. In Toussaint et. al, the intensity of the trapping laser is approximately $1 \times 10^8$ Watts/cm$^2$, and a gold nanorod held in the trap is not melted. As described by Toussain et. al, to enable optical trapping of the light-absorbing gold nanorod, the trapping laser is red-detuned (toward higher wavelengths) by approximately 50 nanometers in wavelength from the plasmon resonance of the nanorod. Toussain et al. acquire a 2 photon fluorescence signal from the vicinity of the trapped rod to obtain evidence of optically trapped nanorods. Notably, the particles used by Toussain et. al are made by procedures that are well known to result in thin layers of organic molecules adsorbed to them. Thin layers such as this are undesirable for some foreseeable applications of probes that are only possible if the probe comprises a bare metal surface, such as using the nanorods as maximally sensitive environmental probes. If thin layers block the close association of the environment to the surface of the metal, the probe would not be as sensitive to its environment; furthermore the electric field enhancement of light near the surface of metal particles becomes weaker as the distance from the metal surface is increased, so signals that result from electric field enhancement of object of interest are weaker in cases where the object of interest is located farther from the surface of the metal.

Rod shaped objects including metal rod shaped objects can be held in three dimensional optical traps when the optical trap is formed by two counter-propagating beams, but this is less desirable than using a single beam, because using two counter-propagating beams prohibits probing nontransparent material, and requires careful alignment of the two counter-propagating beams.

VII. Scanning confocal microscopy acquires optical information about samples. Existing confocal microscopy methods exploit many state-of-the-art methods and technologies comprising: microscope objectives, spatial filters, detectors (for example avalanche photodiodes, photomultiplier tubes, and CCD cameras), scanning stages, galvanic mirrors that steer beams of light, Nomarskii discs, dichroic mirrors, gratings, spatial light modulators, deformable mirrors, and lasers. Frequently microscopes comprise more than one light source, for example the microscope objective focuses light from two lasers that provide light at two different wavelengths. Furthermore, optical detection methods in state-of-the-art scientific apparatuses frequently use light modulation techniques and detection with lock-in amplifiers to reduce unwanted noise.

Modulation of light is done, for example, at tunable modulation frequencies and adjustable duty cycles.

In scanning microscopy, the usual practice is to define the z-direction as the direction of beam propagation in the vicinity of the sample, and the plane formed by the x and y directions as perpendicular to the z-direction.

Chromatic aberration occurs when light that comprises at least two different wavelengths is focused by the same objective or lens such that the first wavelength is focused at a different point along the z-axis than the second wavelength. Lenses most often have chromatic aberration in such a manner that, in comparing two light beams of different wavelengths, the focal length of the longer wavelength light is greater than the focal length of the shorter wavelength of light. However, by using multiple lenses, it is known to be possible to have the opposite case so that the longer wavelength has a shorter focal length.

Apparatuses that are combined confocal microscopes and scanning probe microscopes exist. Typically, an inverted microscope is used, and the scanning probe is mounted in a piece of hardware that rests on a stage. The hardware associated with controlling the scanning probe often at least partially clips the transmission of light from an overhead light source.

BACKGROUND

Objects and Advantages

Broadly, the disclosure relates to acquiring information about small objects, especially optical information and in some embodiments, topographical information. Several objects and advantages of embodiments within the disclosure herein are one or more of the following:

(1) to provide a probe, a pin, which is in accordance with one or more of the following (a-e):
  (a) applies a gentle force to samples to, for example, cause less sample damage;
  (b) is amenable to being controlled, with respect to its position and orientation, by applied electric, magnetic, and optical fields;
  (c) provides a means to improve one or more of the following (i-iv):
    (i) detection of the presence of objects of interest;
    (ii) spatial resolution of topographical imaging; and
    (iii) detection of one or more optical characteristics of objects of interest;
  (d) is amenable to being held in an optical trap;
  (e) is of a size as to reduce the likelihood of trapping of more than one probe in one optical trap.
(2) to provide a means of influencing the position, orientation, and motion of a pin by the application of one or more of:
  (a) a magnetic field;
  (b) an electric field; and
  (c) an optical field.
(3) to provide a means of inducing and modulating optical signals by the application of electric, magnetic, and optical fields to the vicinity of a pin.
(4) provide a means of using source light comprising light from one or more devices such as lasers, lamps, and light-emitting diodes; and in accordance with one or more of the following:
  (a) the source light comprises light that is tuned in frequency in a manner that is dependent on the optical properties of the pin; for example using a laser tuned to the plasmon resonance of a metal nanorod of the pin or to one or more wavelengths that are close to its plasmon resonance; and as another example, using a laser that induces 2-photon absorption in the nanorod;
  (b) the source light is used to induce optical interactions in the vicinity of the pin (comprising the inside of the pin and the surface of the pin); and
  (c) the source light, comprising light that is spectrally broad, to enable, for example, the measurement of an extinction spectrum of the pin and its vicinity.

An advantage of (4)(a) is that, for example, source light comprising light sufficient to induce a nanorod to undergo 2-photon absorption will, in some embodiments, induce lasing in a ZnO nanorod such that the intensity of optical signals that arise from the pin and its vicinity are greater than the intensity of optical signals that arise from illumination light that is not tuned to a frequency that is dependent on the pin. An object of (4)(b) is to induce the optical effects that are measured to characterize the pin and its vicinity. An object of (4)(c) is that in some embodiments it enables the determination of the wavelength of a source of light with which to tune the component of the source light that is used in (4)(a) and (4)(b); in other words, an object is to determine how to tune the source light with the pin. By tuning the pin and the source light, a greater optical signal is acquired.

(5) to provide a means of using single or multiple optical signals, that come from or are modulated by the pin, to be read simultaneously or in sequence. An advantage here is that more optical information about the pin and object of interest may be obtained than can be done with only one or no optical signals. The optical signals are used to provide information about the position and orientation of the pin, and some of the optical signals are used to provide information about the object of interest. The position and orientation of the pin also gives information about the presence and shape of objects of interest.

(6) to provide a means of using multiple pins with an advantageous result that more optical signals may be acquired in a given amount of time, decreasing the time required to obtain the image or spectroscopic signals.

(7) to provide a means of easily aligning a focused source of light, a near-field optical probe, and a volume that provides an optical signal or signals (The pin and the region near the tip of the nanorod of the pin).

(8) to provide a means of using only optical forces to trap a fairly highly absorbing object such as a nanorod with a strong plasmon resonance, in three dimensions, for time periods of at least 1 minute and preferably hours.

(9) to provide a means of probing an object of interest or plurality of objects of interest with a pin or plurality of pins wherein the object of interest or plurality thereof is not affixed to a stage.

(10) to provide a means of estimating the position and orientation of the pin in an optical field.

More objects and advantages follow.

An advantage of a pin used in optical tweezers over SPMs is that illumination light can be tuned to resonances of the probe to increase the optical signals. The pin improves spatial resolution by relying on the nanorod to interact with a sample rather than a metal-coated waveguide as is used in NSOM or a dielectric ally trapped microsphere of approximately 3 micrometer in diameter. In some embodiments, optical signals are generated in the vicinity of the pin or collected from the vicinity of the pin although the illumination light is not tuned exactly to a resonance of the nanorod.

Because the interaction between the pin (the volume or area of the pin that actually interacts with the object of interest) and object of interest occurs on a distance scale of approximately 10 nanometers and significantly less, as can be determined by comparison to many theoretical peer-reviewed scientific publications that describe electric field enhancements of small metal particles, resolution is better than what is possible with conventional near-field scanning optical microscope probes. Electric field enhancements that are brought about by small metal particles occur over smaller scales of distance than the size, approximately 50 nm, of apertures defined by NSOM tips. Nanorods have high optical cross-sections, especially to light polarized parallel to the long axis of the rod. Optical tweezers allow the pin, and the nanorod of the pin to be aligned with the illumination light which is, otherwise, a common technical hurdle of apertureless near-field scanning optical microscopy (ANSOM). The pin gently pokes the object of interest, using less force to probe the sample than many existing cantilever-based scanning probe methods. Lastly, the force of the probe on the sample is adjustable, and for example is increased by increasing the intensity of the light source that is used to form the optical trap.

In comparison to many state-of-the-art apparatuses that are combined confocal microscopes and atomic force microscopes, an optically trapped pin does not require the placement of much of the hardware associated with mechanically holding and scanning the probe in a large vicinity (approximately the size of a human hand) near the microscope objective.

SUMMARY

A significant part of this disclosure is the pin comprising a nanorod and a handle.

DETAILED DESCRIPTION

A description of several embodiments is provided by way of multiple examples, and the examples should not be construed to be limiting. Some examples are labeled and enumerated, such as "P-example 1", and "P-example 2". A person seeking to actually reduce to practice, a PSARP herein, is advised that examples herein are prophetic examples and should not be construed as having been actually reduced to practice at the date of filing. It will be apparent to those of skill in the art that variations and modifications can be made without departing from the spirit and scope of the embodiments and examples disclosed.

I. The Pin

A. P-example 1

Figure 1A:
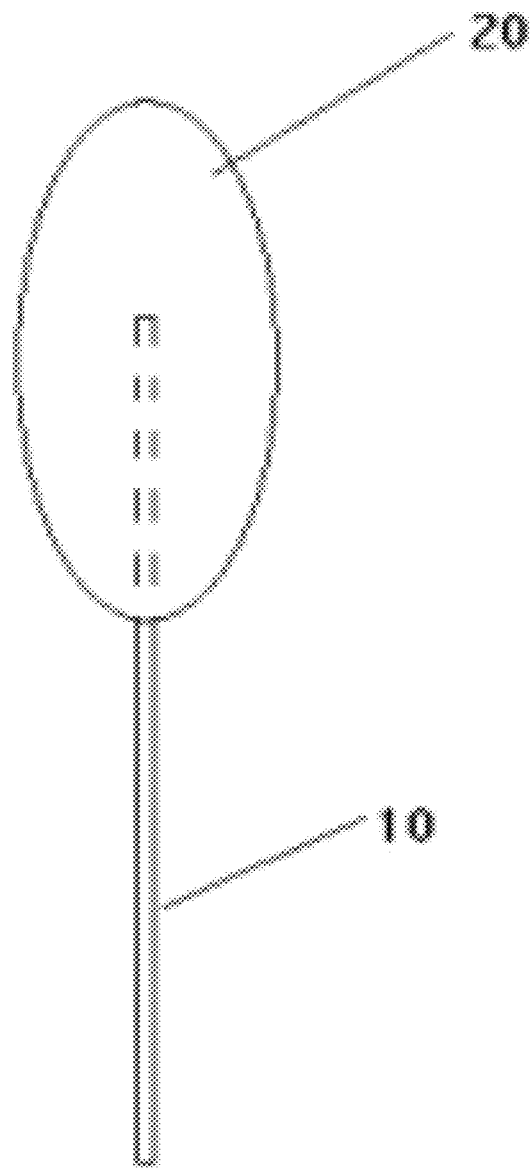
FIG. 1A illustrates a nanorod attached to a handle wherein part of the nanorod is embedded in the handle.

The pin comprises two parts as shown in FIG. 1A: the nanorod (10), and the handle (20) that is attached primarily to one end of the nanorod so that a portion of the nanorod extends outside of the handle. The nanorod is made of a metal such as gold or a semiconductor such as zinc oxide, and the handle comprises $SiO_2$ Part of the nanorod is embedded within the handle, and part of it extends outside of the handle. The diameter of the nanorod is approximately 80 nanometers, and the length of the nanorod is approximately 3 micrometers. The handle is approximately in the shape of an ellipsoid, and the long axis of the ellipsoid is approximately parallel to the long axis of the rod. The length of the handle in the direction parallel to the nanorod is approximately 1 micrometer, and the width of the handle in the direction perpendicular to the nanorod is approximately 100 nanometers. Each dimension stated above in this paragraph may vary, independently of other stated dimensions in this paragraph, by approximately a factor of 10. The portion of the nanorod that extends outside of the handle is variable in length, and preferably so that the length of the portion of the nanorod that extends outside of the handle divided by the width of the portion of the nanorod that extends outside of the handle is greater than approximately 1.2.

A feature of a pin according to P-example 1 is that the nanorod is partially embedded in the handle, so the connection between the pin and the handle is relatively inflexible. When the pin is exposed to a focused optical field formed by a microscope objective, the handle experiences a gradient force that tends to trap the entire pin in the vicinity of the focal point of the optical field. The nanorod experiences a scattering force that tends to orient the pin in the optical field so that the nanorod is farther from the microscope objective than the handle.

B. P-example 2

The pin comprises a linker or plurality of linkers that attach the nanorod to the surface of the handle. Herein, a plurality of linkers is made from chemicals of all the same type or of different types. By way of example, linkers comprise one or more of the following: crosslinking reagents, antibodies, antigens, bifunctional crosslinkers, heterobifunctional crosslinkers, organosilanes, thiols, amines, epoxies, and single stranded DNA. As is well known in the art, linkers are used to covalently or otherwise attach, tether, bind, or link one object or molecule that has a first functional group or first functional site to another object or molecule that has a second functional group or second functional site.

A feature of P-example 2 is that the nanorod is connected to the handle through a relatively flexible linker. When the pin is exposed to a focused optical field formed by a microscope objective, the handle experiences a gradient force that tends to trap the entire pin in the vicinity of the focal point of the optical field. The nanorod experiences a scattering force that tends to orient the pin in the optical field so that the nanorod is farther from the microscope objective than the handle.

Figure 1B:
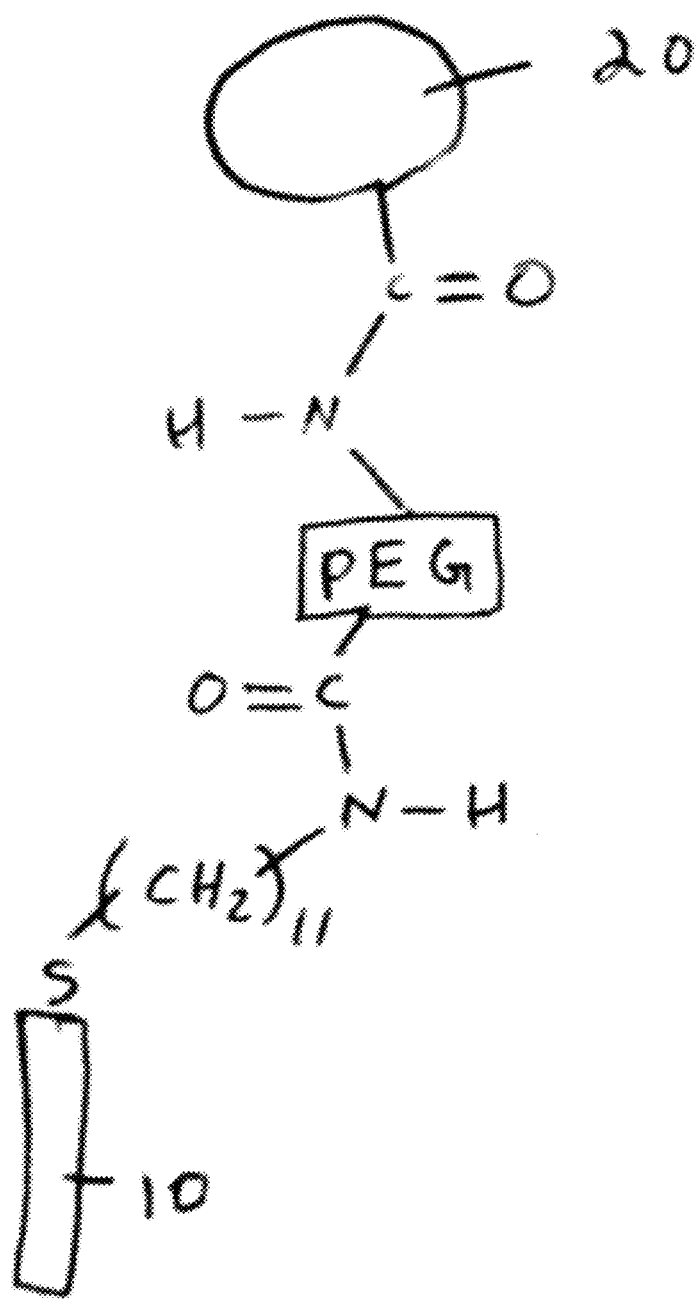
FIG. 1B illustrates a nanorod attached to a handle wherein a plurality of linkers is used for attachment.

FIG. 1B shows a pin comprising a handle (20), and a gold nanorod (10) that is connected by a plurality of linkers. By way of example, the example of the plurality of linkers shown in FIG. 1B is formed with chemicals that are known in the art: $HS-(CH_2)_{11}-NH_2$ attaches to the nanorod; a bifunctional polyethylene glycol (PEG) crosslinker comprising a terminal N-hydroxy succinimidyl ester group attaches to the amine group of the (gold nanorod)-$S-(CH_2)_{11}-NH_2$ to form an amide bond; the bifunctional PEG crosslinker further contains a terminal protected amine group, such as a CBZ (carboxybenzyl) or Boc (tert-butyloxycarbonyl) or Fmoc (9-fluorenylmethyloxycarbonyl) as are commonly known in the art; after the bifunctional PEG crosslinker is linked to the linker, ($HS-(CH_2)_{11}-NH_2$), the protective group (CBZ or Boc or Fmoc) is removed; next the resulting species is exposed to a carbodiimide and a carboxylate derivatized microsphere; the microsphere is attached to the gold nanorod through the plurality of linkers, as is shown in FIG. 1B.

C. P-example 3

Figure 1C:
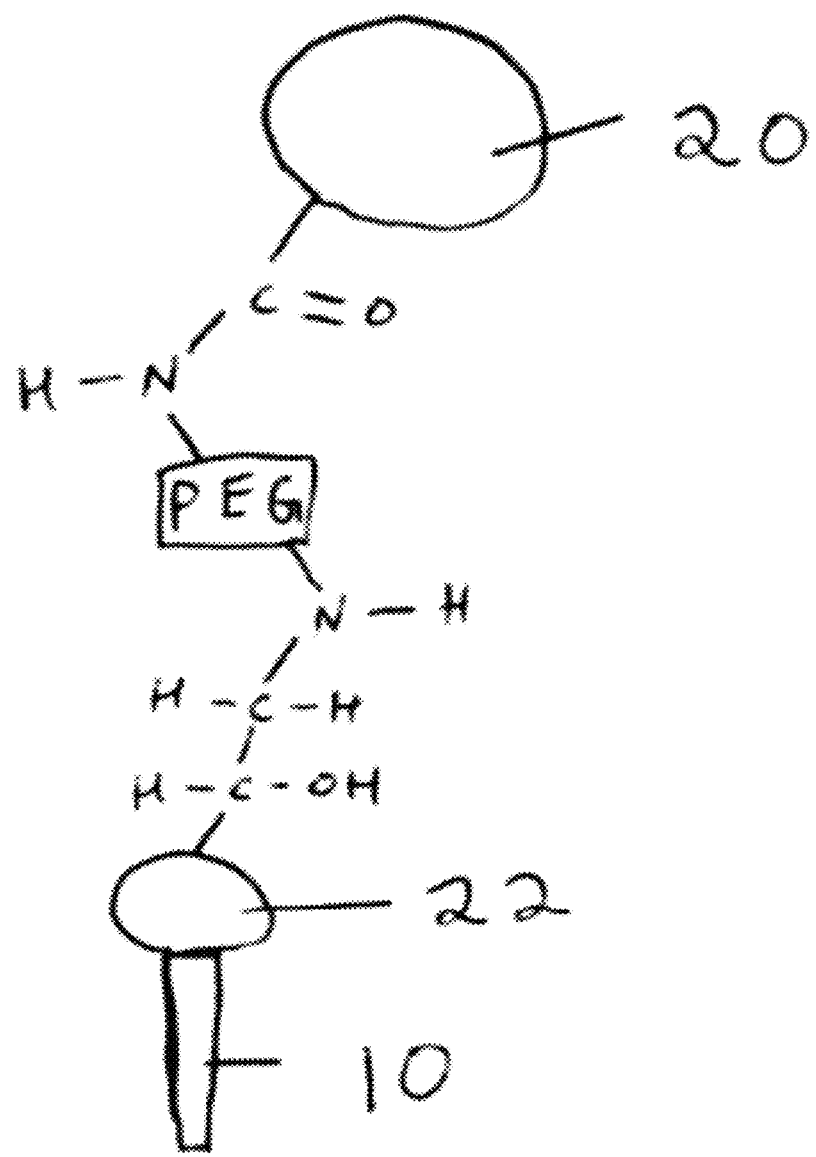
FIG. 1C illustrates a nanorod attached to a quasihandle, and handle attached to the quasihandle.

As shown in FIG. 1C, the pin comprises a nanorod (10) attached to a quasihandle (22) that is attached to a handle (20). The nanorod has a higher optical extinction coefficient than the handle and the quasihandle. When the pin is exposed to a focused optical field formed by a microscope objective, the handle experiences a gradient force that tends to trap the entire pin in the vicinity of the focal point of the optical field. The nanorod experiences a scattering force that tends to orient the pin in the optical field so that the nanorod is farther from the microscope objective than the handle. The quasihandle experiences a gradient force that tends to orient the pin so that the quasihandle is between the nanorod and the handle, and the long axis of the nanorod is pointed along the direction of propagation of the light that is focused by the microscope objective. In an embodiment, the scattering force on the nanorod is larger than the gradient force on the quasihandle.

Linkers are used to connect the nanorod to the quasihandle, and the quasihandle to the handle. The quasihandle comprises silica. The surface of the quasihandle comprises epoxy groups. The epoxy groups react with amines, such as amines that are present on a homobifunctional crosslinker, $(H_2N)$-PEG-$(NH_2)$. When nanorods with quasihandles with epoxy groups are exposed to an excess of $(H_2N)$-PEG-$(NH_2)$, the epoxy groups react with the amine groups to form a link; next the excess $(H_2N)$-PEG-$(NH_2)$ is removed; finally the result is mixed with microspheres that have carboxylates on their surfaces, and a carbodiimide. A result is depicted in FIG. 1C.

II. Means of Forming Pins

A'. Forming Pins Such that the Nanorod is Partially Embedded in the Handle.

Figure 1D:
FIG. 1D illustrates a template with a first metal coating on one side of the template.

Nanorods are grown in a template (102) such as alumina, shown in FIG. 1D, that includes channels oriented substantially perpendicular to the faces, or sides, of the alumina. The diameter of the channels is roughly 100 nanometers, and is variable. Alumina that includes channels is commercially available, or can be made by oxidizing aluminum. U.S. patent application Ser. No. 11/062,983, "Multicomponent Magnetic Nanorods For Biomolecular Separations," by Ki-Bum Lee, Sungho Park, Chad A. Mirkin, and Byung-Keun Oh discloses a method of forming nanorods using a template, in paragraph [0077], a paragraph that begins with, "Magnetic multi-segment nanorods . . . ." This paragraph, until the point where it describes the removal of the "Ag backing" (herein the first metal film (104)) and template by dissolving them with concentrated nitric acid and 3M sodium hydroxide, is incorporated herein by reference.

The formation of nanorods by using a template is well known, but the formation of nanorods in such a manner as to allow the attachment of a handle on only one of the two ends of the nanorods to form the pin (see above section I. The pin) is described below, in Steps 1 to 10. Generally, "controlled etching," similar to step 7, chemically removing or dissolving, procedures are well known, and are carried out by exposing a substrate to an etching solution wherein the time of exposure and concentration of etchant is varied so that the depth of substrate that is dissolved is controlled.

Figure 1F:
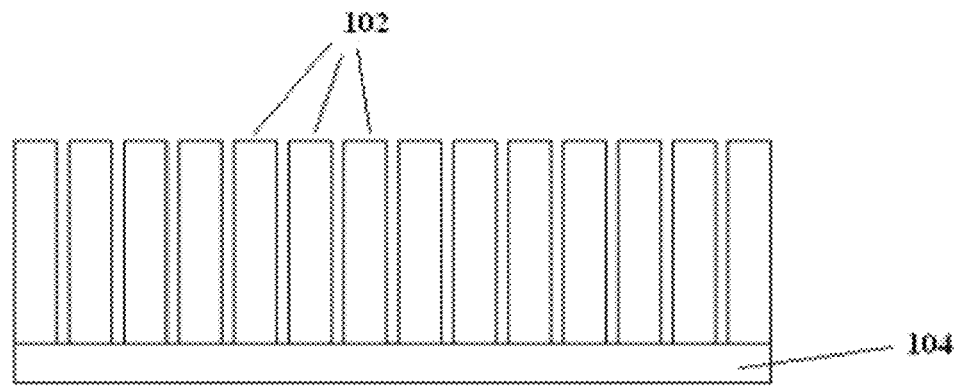
FIG. 1F illustrates a cross-sectional view of a template with a first metal film.
Figure 1G:
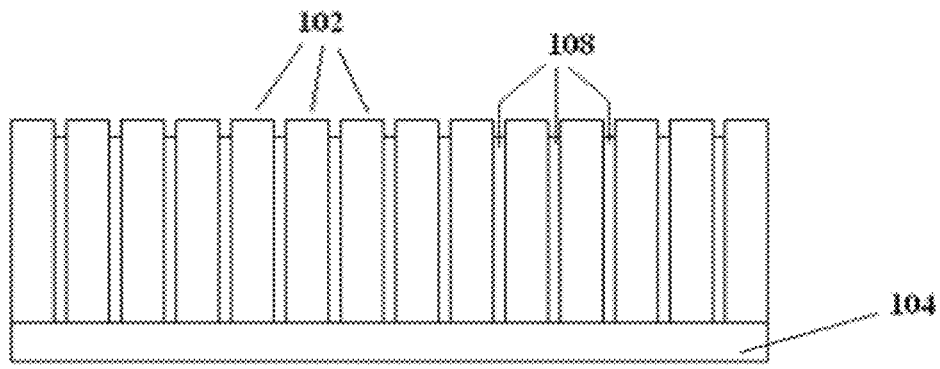
FIG. 1G illustrates a template, a first metal film, and nanorod material in the channels of the template.
Figure 1H:
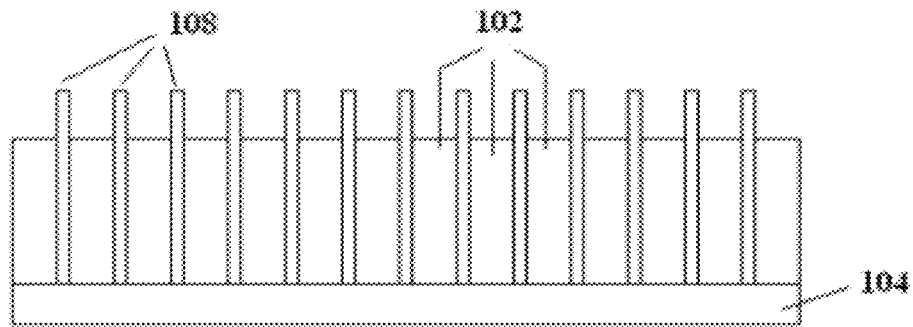
FIG. 1H illustrates a partially etched template with protruding nanorods.

A PSARP is advised that Steps 1-7 prepare gold nanorods so that they are amenable to the attachment of a first linker that attaches only to the region of the nanorods near a first end of the nanorods. In contrast to U.S. patent application Ser. No. 11/062,983 by Lee et al, the "Ag backing" (or first metal film as defined below in Step 1) and the template are not entirely dissolved immediately after electrochemically depositing gold. Step 4, electrochemically depositing the nanorod material (gold), is followed by Steps 5-7 that expose the tips of the gold nanorods (or their "first ends", a region of the nanorods near their exposed tips) so that they are amenable to the attachment of a first linker that attaches selectively to the first ends of the nanorods. A PSARP is advised that other means are possible that produce gold nanorods embedded in the template such that the first ends of the nanorods are exposed, thus Steps 1-7 may be modified as long as the result of Step 7 or an equivalent is attained before proceeding with Step 8. The essential result of Step 7, in the embodiment as depicted in FIG. 1H, is that the nanorod material (108) is in the channels of the template and the nanorod material (108) protrudes above the second side of the template by approximately 50 nanometers.

Step 1. As is known in the art, a first metal film (104) is coated on a first side of the template (102) by vapor deposition, shown in FIG. 1D for a disc shaped template and shown in FIG. 1F, a cross-sectional view. The first metal film (104) is silver. As is known in the art, copper can be deposited instead of silver (and removed later).

Step 2. Optionally, a second metal film and a third metal film are coated on two separate small areas of a second side of the template that is opposite the first side, in such a way that the second and third metal films do not contact each other. The area covered by the second and third metal films is approximately 5% of the second side of the template. The second metal film and third metal films are formed simultaneously by vapor-coating gold onto the second side of the template through a mask with two holes that coincide with the areas of the second metal film and the third metal film.

A feature of Step 2 is that it may make it easier to determine, in Step 4, that the channels of the template are filled with metal and thus indicate when to terminate the electrodeposition of metal in the channels of the template.

Step 3. A first metal is electrochemically deposited into part of the template using the first metal film as a cathode, as is commonly practiced in the art. As described in U.S. patent application Ser. No. 11/062,983 and known in the art, the first metal "leaves headroom to accommodate the growth of additional domains," and will later be dissolved, along with the first metal film (104), or "Ag backing", as it is called in paragraph [0077], beginning with, "Magnetic multi-segment nanorods" in U.S. patent application Ser. No. 11/062,983, "Multicomponent Magnetic Nanorods For Biomolecular Separations," by Lee et. al. Silver is the first metal, and it is deposited so that the lengths of the channels of the template that remain unfilled are approximately 1.5 micrometers.

Step 3.5. Optionally an ohmmeter is connected to the second metal film and the third metal film so that the resistance between the second and third metal films is monitored. Before Step 4, the resistance is relatively high.

Step 4. Next, a nanorod material (108) is electrochemically deposited into the channels in the template, using the first metal film as a cathode. The nanorod material (108) is gold. As is commonly known in the art, gold is electrochemically deposited from a solution comprising gold cyanide. The result after the nanorod material is electrochemically deposited is depicted in FIG. 1G.

It is possible to terminate the electrochemical deposition of Step 4 when the gold completely fills the channels of the template. However, it is also possible to make pins if some "overfill," which is gold deposited as a fourth metal film on the second surface of the template after the nanorods in the channels of the template are formed, occurs. The fourth metal film does not begin to appear until at least some of the channels of the templates are filled with the nanorod material, and the fourth metal film will cause the first, second, and third metal films to be contiguous. Thus, a PSARP is advised that a method to determine when the channels of the templates are filled with the nanorod material is possible and useful to determine when to terminate Step 4. In any case, if overfill does occur, optional Step 6 removes the fourth metal film. If the ohmmeter is connect as described in Step 3.5, then when the nanorods grow through the channels of the template, and reach the second metal film and the third metal film, the resistance that is measured by the ohmmeter is lowered, provided that Step 3.5 is followed. At this time, the nanorod material (108) has filled the pores and is just beginning or has just begun to form a fourth metal film on the second side of the template. Step 4 is terminated when a decrease in the resistance measured between the second metal film and the third metal film is observed.

Alternatively, Step 4 is terminated when, as is well known in the art, that there is an observable change in appearance when the gold begins to form the fourth metal film.

Step 5. Seal the second side of the template from the first side of the template.

The second side of the template is sealed from the first side of the template because Steps 6 and 7 require, respectively, that the fourth metal film and part of the template near the second side of the template are dissolved. As is well-known in the art, a substantially chemically inert gasket such as one made from polyfluorethylene, or Teflon, is placed on the second side of the template. The diameter of the gasket is approximately 5% smaller than the diameter of the template. The gasket is pressed onto the template firmly enough to provide a seal, but not so firmly as to break the template. Furthermore, any device, for example a die, employed to press the a-ring into the template allows an etching solution to make contact with the second surface of the template or the fourth metal film without damaging the device.

Step 6. Optionally, dissolve the second, third, and fourth metal films (a metal film on the second side of the template) if any of them are present. Dissolving gold is commonly performed with aqua regia.

A PSARP is advised that after Step 6, the gold will fill the channels of the template without "overfill," which is gold deposited as a fourth metal film on the second surface of the template in addition to within the channels of the template. It is possible to make pins if the gold does not completely fills the channels of the template.

The second side of the template is exposed to a dilute solution of aqua regia to dissolve the fourth metal film. It is advisable to observe as the metal film on the second side of the template is dissolved and to terminate Step 6 soon after the metal film on the second side of the template is dissolved. The aqua regia is washed away with water to terminate Step 6. Care must be taken so that a significant amount of the gold within the channels of the template is not dissolved. Some of it can be dissolved.

Step 7. Part of the second side of the template is removed by chemically dissolving it to expose approximately 50 nanometers of the first end of the nanorods, as seen in FIG. 1H. It is well known in the art that alumina templates are dissolved with solutions of potassium hydroxide. In Step 7, the desired result is not to completely dissolve the entire template, but to dissolve a part of the template such that approximately 50 nanometers of the nanorods protrude above the template. In alternative embodiments, the exposed portion of the nanorods is more than 1 nanometer and less than 1 micrometer. As commonly known in the art, scanning electron microscopy can be performed after Step 7, and in this case it is done to aid in estimating the average length of the exposed portion of the nanorods.

In some embodiments, the template is partially removed with a 3 M solution of potassium hydroxide, and the etching is terminated by neutralizing the solution with a 3M solution of acetic acid. In some embodiments the template is partially removed with 0.5 M potassium hydroxide. In U.S. Pat. No. 6,869,671 by Crouse et. al, 1.5 M NaOH is used.

Before Step 8, the template with the protruding nanorods is washed thoroughly with distilled or deionized water.

Figure 1I:
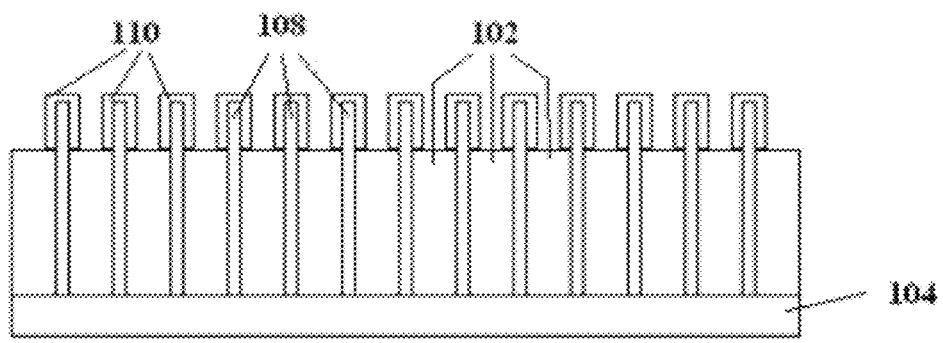
FIG. 1I illustrates a partially etched template and a first linker attached to nanorods that protrude above a template.

Step 8. A first linker (110) is attached to the first ends of the nanorods by treating the template with the protruding nanorods with a solution that contains the first linker and a solvent. FIG. 1I depicts the nanorods with first linkers (110) attached.

The attachment of organic molecules comprising thiols to gold surfaces is well known in the art. Thiols are sometimes referred to as mercaptans, mercapto groups, sulfhydryls, or sulfhydryl groups.

The chemical comprising the first linker has at least two ends. For example, the first linker has two ends. The first end of the first linker attaches to the nanorod (10), and the second end of the first linker will attach to the handle (20) or a second linker. By way of example, not limitation, in some embodiments, the first end of the first linker that attaches to the nanorod consists of a mercapto group (—SH). By way of example, not limitation, the second or more ends of the first linker that attach to the handle or that attach to a second linker is one or more of the following chemical functional groups: an alkoxysilane (R—Si(OCH$_2$CH$_3$)$_3$, R—SiCH$_3$(OCH$_2$CH$_3$)$_2$, R—Si(CH$_3$)$_2$OCH$_2$CH$_3$); a hydrolyzed alkoxysilane (R—Si(OH)$_3$, R—SiCH$_3$(OH)$_2$, R—Si(CH$_3$)$_2$OH), a carboxylic acid (R—COOH), and primary amine (R—NH$_2$) wherein R comprises the first end of the first linker such as for example HS—CH$_2$—CH$_2$—CH$_2$—.

A few examples of first linkers are: mercaptopropyl-dimethyl-ethoxysilane, mercaptopropyl-methyl-diethoxysilane, and 11-amino-1-undecanethiol.

In some embodiments, approximately 5% by weight of 11-amino-1-undecanethiol is dissolved in ethanol to form a linker solution, and the linker solution is exposed to the first ends of the nanorods for 48 hours at room temperature. The template with the nanorods is rinsed with ethanol. Confirmation that the first linker is attached to the first ends of the nanorods is observed, optionally, by a signal from sulfur obtained by x-ray photoelectron spectroscopy of the template with the protruding nanorods after it is treated with the solution that contains the first linker.

In some embodiments, the solvent of the linker solution is toluene, it contains 3% by mass of the first linker, HS—$(CH_2)_4$—Si—$(OCH_3)_3$, and the treatment lasts for approximately 2 days in a closed container at room temperature. In other embodiments, the first linker is HS—$(CH_2)_4$—Si—$(CH_3)_2$—$(OCH_3)$, and the treatment lasts for one week in refluxing conditions. In yet other embodiments, the first linker is HS—$(CH_2)_n$—COOH, such that n has a value between 2 and 12. In yet other embodiments, the first linker is HS—$(CH_2)_n$—$NH_2$, such that n has a value between 2 and 12.

In some embodiments, the adsorption of the thiol is aided by application of 0.4 volts to the nanorods, by attaching a wire to the first metal film. The first metal film and wire are insulated electrically from the linker solution.

In optional Step 8.2, a solubility agent is attached to a first middle portion of the nanorods. The purpose of the solubility agent is to prevent the nanorods from aggregating in the solution that will be used to deposit, grow, or attach the material that forms the handle. This step, Step 8.2, is divided into two solubility sub-steps:

Solubility sub-step 1. Part of the template is removed, exposing the first middle portion of the nanorods. The procedure is similar to Step 7 above. The length of the first middle portion of the nanorods is approximately 300 nanometers, but may vary from approximately 50 nanometers to approximately 2 micrometers. The template with the exposed middle portion of the nanorods is rinsed with water, followed by ethanol.

Solubility sub-step 2. The solubility agent is attached to the first middle portion of the nanorods, similar to Step 8, above, except the solubility agent is used rather than the first linker. By way of example, not limitation, the solubility agent is a thiolated poly-(ethylene glycol), 11-mercaptoundecyl-tri(ethylene glycol). The first middle portion of the nanorods is exposed to a 10 mM solution of the solubility agent dissolved in ethanol for 48 hours.

A ramification of the using a solubility agent is also that the material that forms the handle may also deposit on the solubility agent, thus it is preferable that the length of the first middle portion of the nanorods, where the solubility agent is attached, is a minimal length, provided that the nanorods will not aggregate in subsequent steps that require the nanorods to be colloidally dispersed in a solvent. The formation of pins is possible despite some degree of aggregation.

In optional Step 8.5, a protective agent is attached to a second middle portion of the nanorods. The purpose of the protective agent is to make the deposition of the material forming the handle chemically unfavorable on the nanorods everywhere except near the first linker, and possibly but less preferentially near the solubility agent. This step is divided into two protective sub-steps:

Protective sub-step 1. Part of the template is removed, exposing the second middle portion of the nanorods. The procedure is similar to Step 7 above. The length of the second middle portion of the nanorods is approximately 300 nanometers, but may vary from approximately 50 nanometers to approximately 2 micrometers.

Protective sub-step 2. The protective agent is attached to the second middle portion of the nanorods, similar to Step 8, above, except the protective agent is used rather than the first linker. The protective agent is an N-mercaptoalkane (HS-$(CH_2)_n$—$CH_3$, with the subscript n of this chemical formula having a value of approximately 10. In some embodiments the protective agent is partially fluorinated.

A PSARP is advised that Steps 8.2 and 8.5 may, if incorrectly performed, result in desorption of the first linker. In both Solubility sub-step 1 and Protective sub-step 1, part of the alumina template must be removed without substantially removing the first linker. The stability of the first linker's attachment to the first end of the nanorod is aided by one or more of the following: (a) applying a potential of 0.4 volts to the nanorods, (b) using dimethyl sulfoxide or dimethylformamide in the basic solution that is used to etch the alumina, (c) reducing the concentration of the hydroxide ions (formed by KOH or NaOH) although this will also reduce the rate of etching of the alumina, and (d) using hydrofluoric acid to etch the alumina, although HF is toxic and some care must be used to avoid exposure, including exposure to skin.

Step 9. The first metal film is dissolved, and the template is dissolved.

Figure 1J:
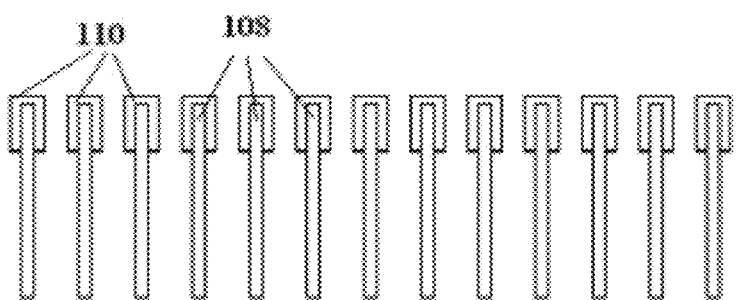
FIG. 1J illustrates nanorods with first linkers.

The remainder of the template is removed by dissolving it in a basic solution such as 1M NaOH, and the result is depicted in FIG. 1I. The first metal film (104) of silver is removed by dissolving it in nitric acid. The result is depicted in FIG. 1J that shows the nanorod material (108) and the first linkers (110). The nanorods with attached first linkers are washed with water.

A PSARP is advised that the first metal film can be dissolved first, so the 1M NaOH can be used to etch the template from the direction of the side opposite the first ends of the nanorods (whereupon the first linker is attached) toward the first ends of the nanorods. With the two sides of the template well sealed from each other, the side with the first linker can be shielded from the basic solution, and the solution can be quickly neutralized with acetic acid, within minutes, of dissolving the template. Alternatively, HF may be used to dissolve the template. Again, the stability of the first linker is of concern, so the advice above regarding Steps 8.2 and 8.5 also apply here.

In optional Step 9.5, the second linker is attached to the first linker. Many means of chemically linking, tethering, conjugating, cross-linking, etcetera are known in the art. A solution for attaching the second linker to the first linker comprises a concentration of second linker that is approximately greater than a million times more than the concentration of nanorods with first linkers attached in the same solution. As is known in the art, siloxane (O—Si—O) bonds can be formed between species that contain silanol (Si—OH) groups, and silanol groups are spontaneously formed from alkoxysilane (e.g. $CH_3O$—Si) and chlorosilane (Cl—Si) groups in the presence of water.

In some embodiments, the first linker and second linker contain Si—OH groups. In some embodiments, the second linker contains an initiator for atom transfer radical polymerization to enable the growth of the handle in the next step. For example, in some embodiments, the first linker is HS-$(CH_2)_3$—Si—$(OCH_3)_3$ such that the sulfur attaches to the gold nanorod, and the second linker is $(H_3CO)$—Si—$(CH_3)_2$-$(CH_2)_2$—$CH_2Br$. The second linker is attached to the first linker by refluxing a suspension of the species comprising the gold nanorods with the first linkers attached to them (they are the result after Step 9), a suitable solvent, and the second linker. In some embodiments, the suspension further comprises a catalyst. For example: the first linker is HS—$(CH_2)_3$—Si—$(OCH_3)_3$, the second linker is $(H_3CO)$—Si—$(CH_3)_2$—$(CH_2)_2$—$CH_2Br$, the suitable solvent is toluene, the catalyst is triethylamine, the concentration of the second linker is 10% by weight, the concentration of the catalyst is 0.5% by weight, the total volume of the suspension is 50 milliliters, and the suspension is refluxed for 24 hours in a vessel with a polyfluoroethylene, or Teflon, lining. In this example, the result would be nanorods with the first ends of the nanorods attached to a total linker of S—$(CH_2)_4$—Si—O—Si—$(CH_3)_2$—$CH_2$Br.

In yet another example: the first linker is HS—$(CH_2)_3$—Si—$(OCH_3)_3$, the second linker is $(H_3CO)$—Si—$(CH_3)_2$—$(CH_2)_2$—$CH_2NH_2$, the suitable solvent is toluene, no catalyst is used, the concentration of the second linker is 10% by weight, the total volume of the suspension is 50 milliliters, and the suspension is refluxed for 2 hours in a vessel with a polyfluoroethylene, or Teflon, lining. In this example, the result would be nanorods with the first ends of the nanorods attached to a total linker of S-$(CH_2)_4$—Si—O—Si—$(CH_3)_2$—$CH_2NH_2$. A ramification of this example is that the amine group can be used to attach to a carboxylic acid by using a carbodiimide such as 1-Ethyl-3-(3-dimethylaminopropyl) carbodiimide.

In yet another example, the first linker is HS—$(CH_2)_{11}$—$NH_2$. and the second linker comprises an N-hydroxy succinimidyl ester, the suitable solvent is water at a pH of approximately 8.3, and the second linker further comprises polyethyelene glycol functional group that is used as a spacer, and the second linker further comprises a terminal carboxylic acid. A ramification of this example is that the polyethylene glycol (PEG) spacer can increase the solubility of the functionalized nanorod in water, and can decrease physical adsorption interactions between the nanorod and a next species that is attached to the carboxylic acid. Polyethylene glycol groups are well known in the art to decrease nonspecific binding of molecules to surfaces, and are well known to be water soluble. A second ramification is that the carboxylic acid moiety can be used to link to an amine by a reaction enabled by using a carbodiimide, a reaction that is well known in the art.

The nanorods with first and second linkers attached can be isolated by many means known in the art, for example, by filtering and washing, or mixing with a solvent to cause precipitation and washing, or by centrifuging and washing. Irreversible aggregation at this stage is undesirable, and can be avoided by judicial choice of solvents and concentrations of species in the solvents. Reversible aggregation may occur, but the nanorods may be resuspended by ultrasonication.

Step 10. A handle is grown to the nanorod through the first linker or second linker.

A polymer is grown from or attached to the first linker or the second linker to form the handle.

Attach-Example 1. In this example, a method of growing a handle to the nanorod through the first linker wherein the first linker is HS-$CH_2$—$CH_2$—$CH_2$—$Si(OCH_3)_3$. and there is no other linker. The solubility agent and the protective agent are used.

The instructions below, in sub-steps, are a modification of Example 1, lines 56-67 of column number 6, of U.S. Pat. No. 4,775,520 by Unger, Giesche, and Kinkel, "SPHERICAL $SIO_2$ PARTICLES." A PSARP is advised that the step of nucleating particles, or of "forming a sol of primary particles," as stated by Unger et. al, is not performed as is the case in Example 1, lines 56-63 of Unger et. al. The growth of the handle, as described herein, relies on reaction conditions that are unfavorable for homogeneous nucleation of $SiO_2$ particles. Lines 56-63 of Example 1 by Unger et al describe homogeneous nucleation of $SiO_2$ particles, referred to by Unger et. al. as obtaining a sol of primary particles. In this example, the handles are nucleated on the silanol moieties on the first linkers on the first ends of the nanorods. The following sub-steps, obvious variations of them, variations of them after reasonable experimentation, or other variations of them that are disclosed herein, are performed to grow the handle:

Sub-step 1. A first handle-growing solution is made that consists of the following components by weight: 11.9 parts water, 62.7 parts methanol, and 2 parts ammonia. The nanorods that have the first linkers attached to them on the first ends of the nanorods are suspended in 81 grams of the first handle-growing solution. The temperature of the resulting suspension is held at 40° C. A PSARP is advised that loss of solvent by evaporation is to be avoided.

Sub-step 2. A second handle-growing solution with a composition by weight of 11.9 parts water, 62.7 parts methanol, and 2 parts ammonia is prepared.

Sub-step 3. To the resulting suspension described in Sub-step 1 is added, with constant mixing, over a period of 24 hours at a constant rate: 36 grams of tetraethoxysilane and 45 grams of the second handle-growing solution, simultaneously. A PSARP is advised that constant mixing, such as stirring or sonication, is required so that the nanorods remain suspended in solution, and the added tetraethoxysilane and second handle-growing solution are mixed with the resulting suspension described in sub-step 1; however, a PSARP is also advised that if the mixing is too vigorous, the nanorods may bend. The PSARP is further advised that some bending of the nanorods is acceptable. Lastly, the PSARP is advised to gently stir with a stirring bar that is coated with polyfluoroethylene, or Teflon.

Sub-step 4. The resulting pins are filtered and washed with a pin-washing solution. The composition of the pin-washing solution is the same as the first handle-growing solution.

Sub-step 5. The resulting pins are suspended in approximately 500 microliters of a suitable pin-suspension solution. The suitable pin-suspension solution is water with the pH adjusted to approximately 8.8.

Sub-step 6. In some embodiments, the handle is grown more by: filtering the pins; changing sub-step 1 so that the pins are added to the first handle-growing solutionrather than the nanorods that have the first handle attached to them; and repeating sub-steps 1-5 but.

This marks the end of attach-Example 1.

This marks the end of Step 10.

A PSARP is advised that: commercially available alumina templates have approximately $1 \times 10^{11}$ channels per square centimeter, and the channels are approximately 50 nanometers in diameter although this is adjustable; the radius of commercially available alumina templates is approximately 2.5 centimeters; the number of pins formed using a commercially available alumina template and the disclosed procedure of a means of forming pins is approximately $2 \times 10^{12}$ and they have a volume of approximately 1 microliter. Some commercially available alumina templates are marketed as filters. The channels of alumina templates are substantially perpendicularly oriented to the first and second sides of the template; however, near one side of the alumina template, preferably the side used as the first side of the template herein, the channels grow together, are not straight, and are not parallel to each other. In contrast, the channels of track-etch membranes are nearly perfectly straight.

A". Alternative means of forming pins such that the nanorod is partially embedded in the handle.

In this section, an alternative means of forming pins is described in 4 steps that uses nanorods or nanowires grown by the vapor-liquid-solid (VLS) mechanism. For example, a plurality of nanowires comprising zinc oxide or silicon can be grown off of substrates using a gold catalyst. The VLS growth results in an ensemble of nanowires that each have a gold nanoparticle attached to the first end of each nanowire, thus the plurality of nanowires comprises attached gold nanoparticles. A few examples of U.S. patents that disclose methods and materials used to grow a plurality of nanowires by the VLS mechanism are U.S. Pat. No. 7,105,428, U.S. Pat. No. 6,882,051, and U.S. Pat. No. 3,493,431; they are incorporated herein in their entirety. Extensive literature, prior art, exists that describes VLS growth of many different kinds of nanowires. A ramification of making pins using semiconductor nanowires is that, for example, ZnO nanowires that lase (as is known in the art), may be used to probe objects of interest using the light emitted by the ZnO nanowire. The light intensity near the nanowire may be significantly brighter than is possible using focused far-field sources, wherein the use of far-field sources results in undesirable background light from the fluorescence of optics.

A"-Step 1. Nanorods are grown from a substrate by a vapor-liquid-solid (VLS) reaction so that they are substantially vertically oriented from the substrate, as is well known in the art.

A"-Step 2. The substrate with the plurality of nanowires is exposed to a first linker, and optionally to a second linker. The first linker attaches to the attached gold particle. The second linker attaches to the first linker. Attachment of linkers is performed by following substantially similar or obvious procedures described herein regarding the attachment of the first and second linker to a gold nanorod that is formed in a template. For example, the first linker is 3-mercaptopropyltrimethoxysilane, and no second linker is used.

A"-Step 3. The plurality of nanowires are removed from the substrate, as is known in the art. This can be accomplished by ultrasonication in a suitable solvent, or by placing the substrate and plurality of nanowires in a suitable solvent and treating them with liquid nitrogen.

A"-Step 4. The handle is grown or attached, similarly as explained above in II, Means of forming pins; A', Forming pins such that the nanorod is partially embedded in the handle; Step 10.

B'. First alternative means of forming pins wherein the nanorods are not partially embedded in the handle.

A pin comprising a nanorod and handle is described wherein the handle is a micro sphere. Microspheres are commonly known in the art, and are available such that the surface of the microsphere has a plurality of functional groups, for example, primary amines, or carboxylic acids. By way of example, not limitation, the pin is formed by linking, using a carbodiimide, a microsphere with a surface with carboxylic acid groups to the first linker that is attached to the nanorod through the mercapto group, wherein the first linker also includes a primary amine group that will form a covalent bond with the carboxylic acid group.

Alternatively, the nanorod is attached to the microsphere through several linkers that connect the first end of the nanorod to the surface of the microsphere. In another alternative, the microsphere is a nanosphere.

A ramification of the first alternative means of forming pins wherein the nanorods are not partially embedded in the handle is that a mixture is obtained wherein the components may comprise: microspheres without nanorods attached, nanorods without micro spheres attached, microspheres with one nanorod attached, microspheres with two nanorods attached, microspheres with three nanorods attached, etc. Means to separate mixtures of different components wherein the components have one or more different characteristics (such as size, electrical charge, and polarizability) are well-known to those in the art, for example, size-exclusion chromatography, electrophoresis, and affinity chromatography.

B'''. Second alternative means of forming pins wherein the nanorods are not partially embedded in the handle.

The procedure described up to and including Step 8 of A', Forming pins such that the nanorod is partially embedded in the handle of II, Means of forming pins, is followed in such a way that silver is first deposited into the channels of the template, and gold is secondly deposited into the channels of the template such that the length of gold in the channels is approximately 500 nanometers. In following Step 7, the second side of the template is etched such that 50 nanometers of the first ends of the nanorods is exposed. In following Step 8, the first linker is attached to the first ends of the nanorods. In following Step 9, the nanorods are removed from the template, and suspended in a suitable solvent.

Next, the second linker is attached to a third linker that is already attached to a microsphere. For example, in following Step 9.5, the second linker comprises a first kind of single stranded DNA. The third linker comprises a second kind of single stranded DNA that is complementary to the first kind of single stranded DNA. In some embodiments, more than one molecule of the first kind of single stranded DNA is attached to the first ends of the nanorods through the first linker, and more than one molecule of the second kind of single stranded DNA is attached to each microsphere. The single stranded DNA is preferably approximately 5 to 2000 nanometers long.

In yet other embodiments, the first kind of single stranded DNA is not complementary to the second kind of single stranded DNA, and a fourth linker is used to attach the second linker to the third linker; the fourth linker is a third kind of single stranded DNA with two regions such that the first region of the third kind of single stranded DNA is complementary to the first kind of single stranded DNA, and the second region is complementary to the second kind of single stranded DNA.

In some embodiments, the second linker comprises an antigen, the third linker comprises an antigen, and the fourth linker comprises an antibody. In some embodiments, the second linker comprises biotin, the third linker comprises biotin, and the fourth linker comprises streptavidin.

In some embodiments, the attachment of the handle to the nanorod is performed in order to detect the presence of the fourth linker. The detection is enabled by the collection of light from the vicinity of the handle.

B'''. Third alternative means of forming pins wherein the nanorods are not partially embedded within the handle.

As is known from prior art, gold nanorods are made using colloidal chemical methods using a solution comprising CTAB, and $HAuCl_4$ Further known in the art is that the ends of the colloidally prepared gold nanorods can be preferentially derivatized with species that act as linkers. Chenxu Yu and Joseph Irudayaraj in, "Multiplex Biosensor Using Gold Nanorods," *Analytical Chemistry* Vol. 79, No. 2, 572-579, 2007, describe the attachment of antibodies and antigens to the ends of the gold nanorods. Guerra Sebastiano's Semester project, "Gold nanorods: Functionalization and Applications," at the University of Neuchatel, June 2007, that also shows the end-functionalization of colloidal gold nanorods is possible and further increases the reputation of this prior-art method as reproducible. Thus, it is possible to use many different kinds of linkers comprising thiols to end-functionalize the colloidal gold nanorods, provided that linkers further comprise a means to grow or attach a handle or quasihandle. Herein, the linker used to end-functionalize the colloidal gold nanorods is referred to as the colloid linker.

A description of the colloid linker is: a mercapto group at one end that is attached to a saturated hydrocarbon spacer; the saturated hydrocarbon spacer is approximately the length of a molecule of cetyltrimethylammonium bromide; the saturated hydrocarbon spacer is optionally attached to a hydrophilic spacer of polyethylene glycol (often called PEG in the prior art); the hydrophilic spacer is approximately 5 nanometers long; in any case, a biotin moiety is located at the opposite end of the colloid linker as the mercapto group. A PSARP is advised that the reference by Yu and Irudayaraj uses something similar to the colloidal linker described herein, except, as is known in the art to occur spontaneously, the biotinylated linker used by Yu and Irudayaraj has dimerized through the mercapto group.

The end-functionalized nanorods are mixed with nanospheres of approximately 5 nanometers in diameter. The nanospheres comprise at least one streptavidin molecule attached to the surface of each nanosphere, and another linker, herein referred to as a superlinker. The colloid linker attaches to the nanosphere through biotin-streptavidin binding, which is one example of antibody-antigen binding. However, many other "binding", "linking", "click-chemistry", and "cross-linking" means are known in the art, that all serve, in this instance and many other instances, substantially similar functions of attaching one species to another species through chemical reactions or chemical binding. A further function known in the prior art is to enable the detection of analytes.

As is well known in the art, there exist means of purifying the product of the mixture that is made from the end-functionalized nanorods and microspheres. Some examples are: size-exclusion chromatography, affinity chromatography, and sorting according to similar means as cell sorting, performed in flow cytometry. A flow cytometry apparatus is modified by a PSARP such that it separates the resulting species into at least a first fraction and a second fraction. If only two fractions are separated, then the fraction that is to be used as a pin is the first fraction according to the remaining description of this paragraph. Otherwise, more fractions are separated from the resulting species, such as a third fraction and a fourth fraction. The first fraction comprises nanospheres with one nanorod attached; the second fraction comprises nanospheres with more than one nanorod attached; the third fraction comprises nanospheres without nanorods attached; the fourth fraction comprises nanorods with no nanospheres attached. The first fraction is mixed with micro spheres that are surface-derivatized with a linker that attaches to the superlinker.

A ramification of this embodiment is that the nanorod comprises a linker on both the first and second ends of the nanorod. The first end of the nanorod is attached to the handle. The second end of the nanorod is used as a probe for species that bind to the species, or linker, that is attached to the second end of the nanorod. For example, if the nanorod's second end has at least one "detecting" single stranded DNA molecule attached to it, then it will bind a component of an object of interest if that component is a DNA molecule that is substantially complementary to the "detecting" single stranded DNA molecule.

Another ramification of this embodiment is that pins that comprise one handle and more than one nanorod can be made.

C''''. Alternative means of forming the pin wherein the pin further comprises a quasihandle.

A pin is made according to II, Means of forming pins, such that the pin comprises a gold nanorod and a silica handle. The silica handle is made in such a way that it is fairly small, and in the approximate shape of an ellipsoid with major and minor axes of approximately 20 nanometers (fairly small). As known in the art, the surface of silica is negatively charged when in an appropriate solvent such as water with an appropriate pH that is above 7. Moreover, there are well-known surface derivatization chemical techniques of adjusting the charge of silica surfaces using alkoxysilanes or other grafting agents or combinations thereof. After pins with a small silica handle are made, they are washed and suspended in a suitable solvent for attaching a second handle. As a matter of lexicography, herein, at this point forward, the handle of this embodiment and derivatives of this embodiment (of C'''' Alternative means of forming the pin wherein the pin further comprises a quasihandle), at present, is re-defined as a quasihandle, and the second handle is given the name "handle." A silica-microsphere linker is used to attach the quasihandle to the handle that, like the quasihandle, has a negatively charged surface. (There exists an abundance of chemical linking techniques, for example cross-linking agents, in the prior art to use as a silica-microsphere linker.) Thus, the handle and quasihandle repel each other by coulombic force. A ramification of this embodiment is that it is easier to ensure that the handle does not envelop or encapsulate the nanorod when the handle grown or attached separately from the nanorod. A further ramification is that there is greater flexibility in the composition of the handle, including handles of high index of refraction, and handles that are made by linking a single member of a plurality of microspheres with narrow size dispersion. Yet another ramification of this is that when the quasihandle and nanorod undergo thermal motions in an optical trap, it is unfavorable for them to adsorb to the surface of the handle. Moreover, when held in the optical trap, the quasihandle experiences a gradient force that is on average in the opposite direction as the scattering force on the nanorod, thus tending to orient the nanorod so that the nanorod is oriented along the z-axis, along the axis of beam propagation of light that is used to form the optical trap. Yet another ramification is that the gradient force on the quasihandle tends to position the nanorod along the z-axis, below the handle. It is undesirable for the quasihandle to be large, so that the gradient force on the quasihandle is greater than the scattering force on the nanorod.

V. Embodiments of the Use of the Pin as a Probe

A. Example 1

Introducing the Pin to a Microscope

Figure 2A:
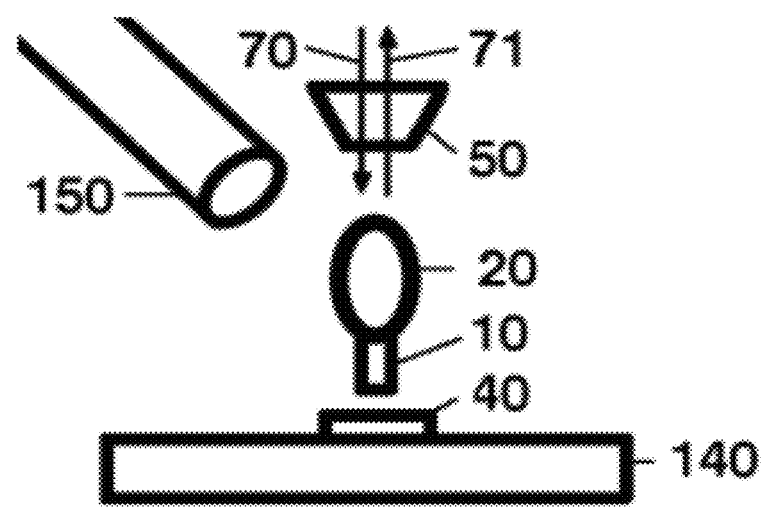
FIG. 2A illustrates a pin in a microscope near an object of interest.

FIG. 2A shows an embodiment of an apparatus comprising the pin in a microscope. The pin comprises the nanorod (10) and the handle (20). An object of interest (40) is affixed to a stage (140).

Before the pin, comprising the nanorod (10) and the handle (20), is introduced to the vicinity of a first focal point that is formed by a first component of an input light beam (70) that is focused by a microscope objective (50), the position of the microscope objective (50) or the stage (140) is adjusted so that the nearest surface of the object of interest (40), affixed to a stage (140), is in focus. Next, the distance between the microscope objective and the stage is increased by approximately between 10 micrometers and 50 micrometers. The first component of the input light beam is approximately 50 milliwatts of a laser of 830 nanometers wavelength, and forms the first focal point. Next, at least one of the pins is introduced through a capillary tube (150) or micropipette to an introduction region that is approximately between 5 micrometers and 500 micrometers of the first focal point.

Capillary tubes and micropipettes are well known in the microscopy arts, and provide a means to introduce or withdraw species into or from a region near or within the object of interest. In an embodiment of the invention, a capillary tube or micropipette is used to introduce one or more pins into the liquid medium that lies between the microscope objective and the stage.

After the pin becomes optically trapped near a first equilibrium position in a first optical trap that is formed near the first focal point, the capillary tube is moved away from the introduction region. The first equilibrium orientation of the pin is with the nanorod pointed along the direction of propagation of the input light beam. Because the nanorod has a higher extinction cross-section than the handle, the nanorod experiences a stronger scattering force than the handle. A gradient force on the handle, formed by the focused input light beam, is sufficient to optically trap the pin in three dimensions. The numerical aperture of the microscope objective (50) is approximately between 1.2 and 1.4, and the microscope objective (50) is a water-immersion objective.

Example 1.5. The pin, trapped according to Example 1, is used as a probe in a photon force microscope. U.S. Pat. No. 6,833,923 B2, "Method for 3D Object-Scanning," by Florin, Harber, and Stelzer is incorporated herein by reference. U.S. Pat. No. 5,445,011, "Scanning Force Microscope Using an Optical Trap," by Lucien Ghislain and Watt Webb is incorporated herein by reference. As known in the art, the position and the orientation of the pin are subject to Brownian motion, thermal forces, or thermal fluctuations. The tendency is that the pin is located near the first equilibrium position, and approximately in the first equilibrium orientation.

The z-axis is the axis going through the center of the input beam that is present at a given time. When two input beams are focused at different positions in the x-y plane, and modulated so that when one is off, the other is on (and vice versa), then the z-axis moves back and forth at the same modulation frequency, and both the z-axis and the z-direction is along the direction of propagation of whichever input beam that is on. In an embodiment, the input beams are modulated at 50 kHz, although the modulation frequency is variable between approximately 1 kHz and 2000 kHz.

The pin, in a tightly focused optical field, experiences forces comprising: a gradient force on the handle, and a scattering force on the nanorod, and thermal (random) forces.

The pin is formed such that the gradient force on the handle is greater than the total scattering force on both the nanorod and the handle. Thus, the pin is optically trapped in three dimensions. However, in other embodiments, a weak optical trap or nonexistent optical trap in the z-direction is balanced by a force of the object of interest and the scattering force, and an optical trap in the x and y directions is provided. As is known in the art, even a substantially absorbing object can be trapped in three dimensions by being trapped in two dimensions (x and y) optically, and trapped in the third dimension (the z-direction) by the balance of the scattering force and the normal force of a surface on the trapped probe. A ramification of a weak or nonexistent optical trap in the z-direction is that forces of adsorption of the pin on the surface tend to become significant, such that the pin may become stuck on the surface; this is undesirable in most foreseeable applications.

The scattering force on the nanorod tends to cause the location of the nanorod to be located at a position farther from the microscope objective than the handle (farther along the z-direction). This is desirable because it tends to allow the nanorod to make contact with the object of interest rather than the handle. Compared to the handle, the nanorod has more favorable properties for acquiring images and spectra, such as at least one of: smaller size so as to yield better spatial resolution of the topography of the object of interest, higher electric field enhancement factors so as to yield greater optical signals, photoemissive properties and small dimensions so as to yield higher spatial resolution of optical signals that are influenced by the object of interest (e.g. fluorescence).

A plurality of linkers is a plurality, herein, regardless of whether each member of the plurality of the linkers is of the same type as other linkers or is a different type.

A ramification of using a longer linker or a longer plurality of linkers rather than a shorter linker or a shorter plurality of linkers is that the longer linker or longer plurality of linkers is subject to comparatively greater thermal fluctuations of position and orientation. The optical field is decreasing in intensity along the z-direction at every point that is farther from the microscope objective than the focal point, moreover, a longer tether between the handle and the nanorod constrains the nanorod to a larger region of space. In the case of shorter linkers, the scattering force on the nanorod is greater.

Another ramification of using any length of flexible linker between the surface of the handle and the nanorod is that the nanorod may adsorb irreversibly to the surface of the handle, and this is undesirable. This effect is reduced by one or more of the following: using a nanorod with a high extinction coefficient so that the scattering force is greater than the force of adsorbtion; using an "unsticking" light pulse that is intense enough to cause an impulsive scattering force on the nanorod such that it desorbs from the surface of the handle; and using a pin that comprises a quasihandle that has the same sign of coulombic charge (preferably negative) as the handle. For example, the quasihandle is made of silica, and as is well known in the art, steps are taken to ensure the surface charge of the quasihandle is negative by using a pH above the pKa of surface Si—GH groups that are present on the surface of the silica of the quasihandle; the surface of the handle is also negatively charged, such as it is when it is a sulfate functionalized microsphere which are commercially available; the coulombic repulsion between the quasihandle and the handle tends to prevent the nanorod from sticking to the handle. The scattering force on the nanorod results in the nanorod "seeking" a position where the optical field is less intense, and that position is closer to the stage than the handle, or farther along the z-direction than the position of the handle.

As a result of the balance between the scattering force and the gradient force along the z-axis, the pin's equilibrium position is near but slightly farther along the z-direction than the first focal point. In comparing the scattering force on the nanorod (of the pin) at two different positions located a distance from each other along the z-axis; the scattering force is lower at the farther distance. A fairly short length of the linker or plurality of linkers between the nanorod and the handleexists. The fairly short length is approximately the same width as the handle, approximately 300 nanometers. This does not apply to other embodiments wherein the nanorod is partially embedded in the handle. An advantage to embodiments comprising gold nanorods that are not partially embedded in the handle is that the longitudinal plasmon resonance of the colloidally prepared gold nanorods can be tuned, as is known in the art, for example to within a spectral range of 800 nanometers to 830 nanometers. The input light beam comprises a tunable laser such that the tunable laser is tuned to a wavelength near the longitudinal plasmon resonance of the nanorod that is attached to the pin in the optical trap. Greater electric field enhancement, thus greater optical signals, are possible when light is near a plasmon resonance. A titanium sapphire laser that is tunable is used in some embodiments;

and both the gold nanorod of the optically trapped pin and the titanium sapphire laser are tuned to 830 nanometers.

A ramification of a nanorod that is not partially embedded in the handle is that the stiffness of the position of the nanorod with respect to the position of the handle depends on the linker or plurality of linkers. Highly compliant linkers allow the second end of the nanorod to undergo larger mean square displacements in comparison to a stiff connection that is provided by a nanorod that is partially embedded in the handle. However, this effect is reduced by using a nanorod with a relatively high optical extinction coefficient at the trapping wavelength because the scattering force will favor an orientation with the nanorod located along the axis of beam propagation. When, as in some embodiments, the longitudinal plasmon resonance or the nanorod and the titanium sapphire laser are in tune, the scattering force is high.

An advantage of using a large handle with a large index of refraction at a trapping wavelength is that the gradient force on the handle is more certain to sufficiently trap the pin in spite of the scattering force on the nanorod. An advantage of using a relatively small handle is that it has greater mass such that it accelerates more under a given force than does a more massive handle; when two modulated light beams are used to induce oscillations in the position and orientation of the pin, a fast response is desirable because it allows a higher modulation frequency and more bandwidth. A disadvantage of a small handle is that it experiences a smaller trapping potential, thus Brownian motion is more significant and forces of adsorption of the nanorod on the object of interest also become more significant. A handle with a large index of refraction isdesirable. A handle that is nearly the same size and shape as the focal volume (an ellipsoid for Gaussian beams) is desirable.

In an embodiment, the pin is one in which the scattering force on the nanorod is strong enough so that the equilibrium orientation of the pin is with the nanorod pointing away from the microscope objective, along the z-axis, but the scattering force is not so strong that the pin is in a weak optical trap overall. The gradient force is strong enough, and the mass of the pin is low enough, so that the pin responds rapidly to a modulated input light beam and does not adsorb to the surface of the object of interest. Thus, the pin comprises a handle with a high index of refraction, and the width of the handle is approximately the size of beam waist of the first input light beam. The potential, a function of parameters comprising the position and orientation of the pin in the first optical trap, that defines the equilibrium orientation and equilibrium position of the pin (as the orientation and position of the potential's minimum) in the first optical trap is modeled as a substantially deep and steep harmonic potential. The depth of the potential is approximately ten times the thermal energy at room temperature, and the slope of the potential is approximately 100 piconewtons per micrometer. The input light beam is, preferably, not so intense as to fairly quickly, within approximately 10 minutes, cause damage to the pin or the object of interest. A steep and deep potential allows a greater modulation frequency and faster image acquisition.

B. Example 2 of the Pin in a Microscope

A pin is optically trapped as in Example 1 of the pin in a microscope. The position and motion of the pin, relative to a stage (140), is influenced by moving one or more of the following: the stage (140), the position of the first focal point, and the position of a second focal point of a second component of the input light beam (70). The first focal point and second focal point are at an approximate distance of between 10 and 100 nanometers, along the x-axis.

The position and motion of the pin is influenced by modulating the intensity of the first component of the input light at a first modulation frequency, and modulating the second component of the input light at the first modulation frequency such that the second component of the input light is modulated out of phase with the first component of the input light. In other words, when the first component is on, the second is off, and vice versa. The first component of the input light, while it is on, superimposes acceleration toward the first equilibrium position on the thermal motion of the pin. The second component of the input light, while it is on, superimposes acceleration toward the second equilibrium position on the thermal motion of the pin. The wavelength of the input light beam (70) is 830 nanometers (both the first and second components are the same wavelength); the nanorod is a gold nanorod with a longitudinal plasmon resonance at 830 nanometers. The pin oscillates along the x-axis (disregarding thermal motion). In an embodiment, the first modulation frequency and second modulation frequency is 50 kHz, however they are variable between approximately 0 kHz and 2000 kHz.

C. Example 3 of the Pin in a Microscope

The position and motion of the pin is influenced as in Example 2 of the pin in a microscope such that it oscillates along the x-axis.

Furthermore, a third component of the input light is focused at a third focal spot that is approximately half way between the first focal spot and the second focal spot, but farther below them in the z-direction such that the third focal point is approximately in the same plane as the second end of the nanorod when the pin is in either of the first or second equilibrium positions. The third component of the input light is also at 830 nanometers wavelength, but is modulated at a third frequency that is different from the first modulation frequency and the second modulation frequency. Inan embodiment, the first modulation frequency and second modulation frequency are 50 kHz, and the third modulation frequency is 110 kHz. However, the first, second and third modulation frequencies are variable between approximately 0 kHz and approximately 2000 kHz.

Figure 2B:
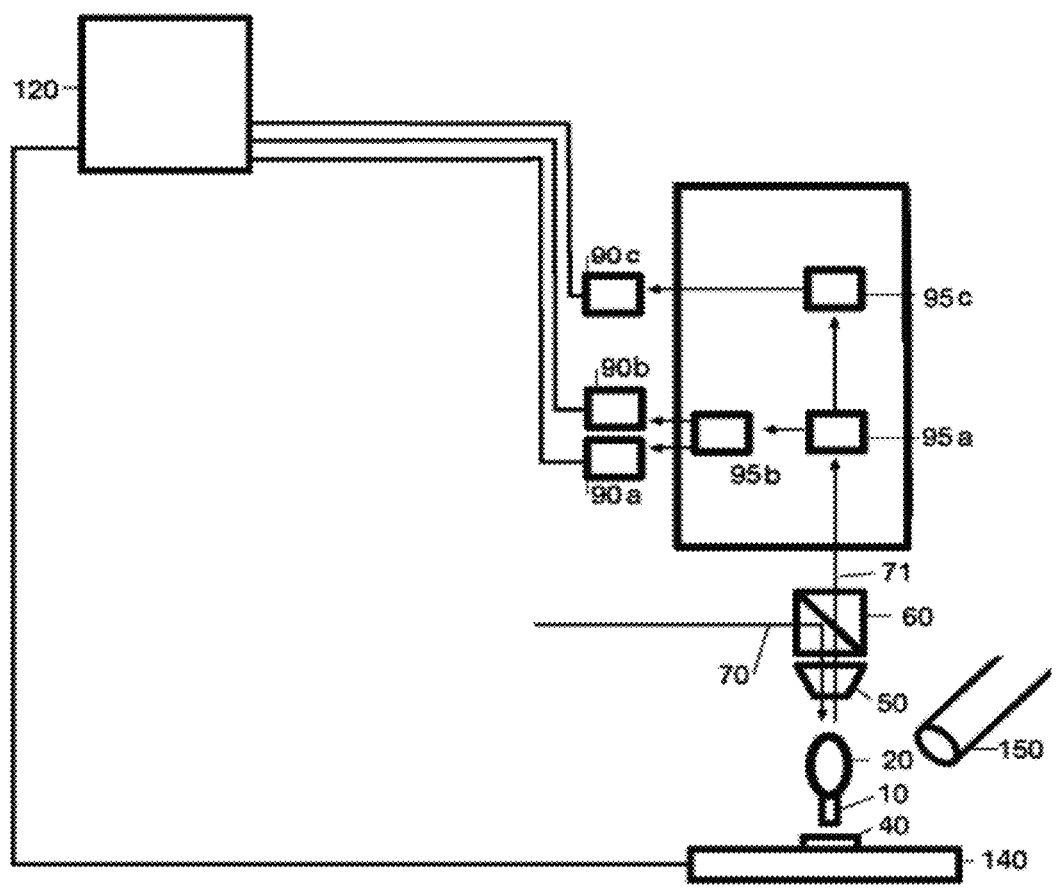
FIG. 2B illustrates a pin in a microscope with collection optics.

As shown in FIG. 2B, a collected light beam (71) is collected by the microscope objective. The collected light beam is separated into various components by optics (95). The optics comprise things that are well known in the art: a first spatial filter to reject light that does not come from the vicinity of the pin; a means of reflecting light at 830 nanometers and passing other wavelengths (95a); the light at 830 nanometers is directed toward a means of separating light (95b) into a first component that was polarized along the x-direction in the vicinity of the pin and directing the first polarized component to a first photodetector (90a), and a second component that was polarized along the y-direction in the vicinity of the pin and directing the second component to a second photo detector (90b); a mirror (95c) for reflecting a component of the collected light beam that consists of inelastically scattered light toward a device to acquire a spectrum of the inelastically scattered light.

As is well known in the art, there exist means to measure the normalized difference signal of x- and y- polarized light. The signals generated by the first and second photodetectors are used to measure the intensity of the x and y polarizations. A normalized difference intensity of the x and y polarizations is demodulated by a lock-in amplifier at the third modulation frequency to give an amplitude. A reference amplitude is stored by a computer (120) while the pin is located far from the object of interest (40) that is attached to the stage (140).

D. Example 4

Initial Approach of the Pin to the Sample

Building on Example 3, and similar to the prior art of tapping mode scanning microscopy, a set-point is calculated and stored by the computer, which is approximately 50% of the reference amplitude. A user may adjust the set-point, as is commonly provided for in atomic force microscopes. Next, the stage (140) is moved incrementally toward the pin in the z-direction, and a record of the amplitude is made. It is particularly suggested that an initial approach to the sample be tested in regard to the effect of the approach on the amplitude. A PSARP is advised that it is also useful to record the effects of the initial approach on the normalized signals measured by the first and second photodetectors. When the pin is far from the sample, a small amount of approach has little effect on the amplitude. When the stage has approached the vicinity of the nanorod, the amplitude decreases. The approach is terminated, and the stage held at a constant position when the amplitude equals the set-point.

E. Example 5

Scanning

Building on Example 4, a feedback signal is used to provide z-placement feedback. As is frequently provided for in the prior art of scanning probe microscopes, the probe (or the stage) is raster scanned through x and y positions, and a signal is acquired to determine and/or adjust the z-position of the probe. The feedback signal, in this example, is the amplitude. The stage is raster scanned in x and y (while dithering the pin in x), and the z-position of the stage is adjusted according to a feedback loop that: moves the stage toward the microscope objective if the feedback signal increases above the set-point; and moves the stage away from the microscope objective if the feedback signal decreases below the set-point. As the scanning is performed, optical signals that arise from the vicinity of the pin are collected by the microscope objective, and recorded by detectors and the computer. The recorded optical signals provide topography and spectroscopy of the object of interest.

F. Example 5.5

Point of Interest

Optical signals are recorded from the vicinity of the pin while the pin is held at a constant position to acquire spectra of a point of interest.

F. Additional or Alternative Embodiments of the Pin in the Microscope

Example 6

The use of the pin as a probe is similar to Example 3, except the first focal point and second focal point are at an approximate distance of between 10 and 100 nanometers, along the z-axis. As a result, the tendency for dithering motion of the pin is along the z-axis rather than the x-axis.

The following two examples provide for this alternative embodiment:

Example 6a. The first component of the input light beam is collimated when it reaches the microscope objective; and the second component of the input light beam is diverging when it reaches the microscope objective. As a result, the second focal point is farther from the microscope objective than the first focal point, and in some embodiments, both the first and second components of the input light share the same z-axis.

Example 6b. The input beam comprises two collimated beams: the first beam is at 405 nanometers wavelength, and the second beam is at 830 nanometers wavelength. The chromatic aberration of the microscope objective causes the first equilibrium position to be closer to the objective than the second equilibrium position.

Example 7a

The root-mean-square error of the amplitude, rather than the amplitude, is used as the feedback signal to provide z-placement feedback during scanning. If the tendency of oscillation of the pin is along the z-axis rather than along the x-axis (as is the case for some alternative embodiments wherein two components of the input beam are focused along the same z-axis at different points), the amplitude of the x-polarized light is not expected to be sensitive to the distance of the pin to the object of interest. When the pin is relatively far from the object of interest, the root-mean-square error of the amplitude is relatively high; and when the pin is relatively close to the object of interest, the root-mean-square error of the amplitude is relatively low.

Example 7b

The pin comprises a fluorescent handle that comprises either semiconductor nanoparticles or the fluorescent polymer. The pin is dithered along the z-axis in the manner described in Example 6b. The pin fluoresces at wavelengths between 405 nanometers and 830 nanometers. The amplitude of the fluorescence intensity is measured rather than the polarization of scattered light at 830 nanometers to give the feedback signal. When the second equilibrium position of the pin moves closer to the object of interest, the amplitude of the fluorescence intensity increases. Thus, the feedback is such that when the amplitude of the fluorescence intensity increases, the stage is moved farther from the sample, which is rather dissimilar to other embodiments.

Example 8 is omitted.

Example 9

A Plurality of Pins of Different Kinds

As in Example 8, a plurality of pins are held in the plurality of optical traps. However, the plurality of pins comprises pins made by different means. Each pin in the plurality of pins comprises a nanorod comprising gold and a handle comprising silica, and each pin has the additional species attached to its second end, wherein the additional species is one of: a first kind of antibody, a second kind of antibody, a third kind of antibody, a fourth kind of antibody; a first kind of antigen, a second kind of antigen, a third kind of antigen, a fourth kind of antigen; a first kind of single stranded DNA, a second kind of single stranded DNA, a third kind of single stranded DNA, and a fourth kind of DNA; a first kind of RNA; a second kind of RNA; a third kind of RNA; and a fourth kind of RNA.

The plurality of pins comprises substantially similar handles and nanorods, but each pin is subject to having a different additional species that is attached to the second end of the nanorod.

Example 10

The Object of Interest is not Attached to the Stage

In some embodiments, the object of interest (40) is not attached to the stage (140). The object of interest is introduced in a medium, water, which is the same medium in which the pin is optically trapped. The sample is introduced through a second capillary tube to a position in an x-y plane that intersects the z-axis beneath the pin. The sample consists of a first kind of antibody, a second kind of antibody, a third kind of antibody, a fourth kind of antibody; a first kind of antigen, a second kind of antigen, a third kind of antigen, and a fourth kind of antigen in unknown proportions. A ramification of Example 10 is that the sample can be characterized through spectroscopic means, for example by Raman spectra, plasmon resonance shifts, and coherent anti-Stokes Raman scattering.

B. Alternative Embodiments

Alternative embodiments are enumerated below so that particular embodiments comprise one or more alternative embodiments, functional equivalents of them, or obvious modifications of them.
1. The object of interest is a sample, a part of a sample, or a plurality of samples. By way of example, samples are one or more of the following: molecules, antibodies, antigens, viruses, cells, and surfaces. Objects of interest may be attached to surfaces, or may be suspended or dissolved in a solvent.
2. The pin is attached through one of the linkers on the handle to the end of an optical fiber. The source light either travels through the optical fiber or is focused on the optical fiber from the microscope objective. The collected light is collected through the optical fiber or by the microscope objective.
3. The light source comprises one or more of the following: near infrared laser, visible laser, broad band lamp or plurality of lamps, pulsed laser, chopped beam, radially polarized light from a donut-shaped mode from a laser.
4. Source optics (85) comprise a means to generate a vector beam. In some embodiments, the source optics (85) provide a means to generate a radially polarized donut beam. A disclosure that describes a means to generate a radially polarized donut beam is in U.S. patent application Ser. No. 11/418,694 (Toussaint et al.). As mentioned in paragraph 73 of U.S. patent application Ser. No. 11/418,694 (Toussaint et al.), radially polarized light may be used to exploit the plasmon resonance of metal particles. As disclosed herein, the use of radially polarized light as a component of the illumination light that is focused in the vicinity of a pin provides a means of aligning the oscillating electric field vector of this component of the source light with the long axis of the nanorod when the pin is optically trapped in an orientation such that the long axis of the nanorod is along the direction of propagation of the beam.
5. The collection optics include a spatial filter.
6. The detectors are one or more of the following: a CCD camera, a photodiode, an avalanche photodiode, or a photomultipler tube.
7. An extinction spectrum of the vicinity of the pin is obtained by splitting a beam of white light from a lamp and using one portion as a reference beam, and sending the other portion through the objective to the vicinity of the pin, and collecting as a signal beam by means that are well-known in the art, such that:
   (i) the light transmitted or scattered in the forward direction is used as the signal beam; or
   (ii) the light scattered in the backwards direction is used as the signal beam.
The forward scattered light may be collected by a condenser lens or a second microscope objective, as is well known in the art.
8. The extinction spectrum of the vicinity of the pin is used to determine a plasmon resonance mode of the nanorod of the pin, and a component of the input light beam is tuned to near the plasmon resonance mode of the nanorod of the pin. A ramification of this is that greater optical signals can be collected from the vicinity of the pin when at least one component of the source light is on resonance with the pin.

CLOSURE

While a preferred embodiment of the present invention has been described, it will be apparent to those skilled in the art that many changes and modifications may be made without departing from the invention in its broader aspects. For purposes of lexicography, what heretofore has been termed a handle in some disclosed embodiments is also termed an attached member, without affecting its composition or ultimate utility.

I claim:
1. A pin comprising
   a nanorod,
   a first linker, and
   an attached member;
   wherein the first linker is attached to a first end of the nanorod and the first linker is not attached to the opposite end of the nanorod,
   wherein the opposite end of the nanorod is located outside of the attached member,
   wherein the volume of the attached member is approximately between 6000 cubic nanometers and 500 cubic micrometers, and
   wherein the volume of a part of the nanorod that is located outside of the attached member is approximately between 100 cubic nanometers and 2.5 cubic micrometers.
2. The pin of claim 1,
   wherein the attachment of the first linker to the first end of the nanorod is by a method comprising:
   (a) etching part of a template wherein a plurality of nanorods are grown so that the first ends of the nanorods protrude from the template and the remainder of the nanorods remain embedded in the template, and
   (b) attaching the first linkers to the first ends of each of the nanorods.
3. The pin of claim 1,
   wherein the first end of the nanorod is between 1 and 10 nanometers long.
4. The pin of claim 1,
   wherein the first end of the nanorod is between 10 and 100 nanometers long.
5. The pin of claim 1,
   wherein the pin is part of a microscopy device.

6. The pin of claim 1,
wherein the pin is subjected to forces arising from a focused optical field.

7. The pin of claim 1,
wherein a region of the nanorod which is nearest a region of the surface of the attached member is oriented substantially normal to said region of the surface of the attached member;
wherein the region of the nanorod is the lesser of 50 nanometers of the length of the nanorod located closest to the surface of the attached member and the entire length of the nanorod; and
wherein substantially normal is within 45 degrees of perfectly normal.

8. The pin of claim 1,
wherein the attached member comprises silica.

9. The pin of claim 1,
wherein the diameter of the attached member is at least 1.1 times larger than the diameter of the nanorod.

10. The pin of claim 1,
wherein the pin is optically trapped.

11. The pin of claim 1,
wherein the attached member comprises a polymer.

12. The pin of claim 1,
wherein the attached member comprises a polymer, and wherein the polymer is grown from the first linker.

13. The pin of claim 1,
wherein the attached member comprises a polymer, and wherein the polymer is attached to the first linker.

14. The pin of claim 1,
wherein the width of the attached member in the direction perpendicular to the nanorod is greater than approximately 100 nm.

15. A pin comprising
a nanorod,
a first linker comprising a chemical, and
an attached member comprising a polymer;
wherein the first linker is attached to a first end of the nanorod and the first linker is not attached to the opposite end of the nanorod; and
wherein the chemical is attached to the first end of the nanorod and the chemical is not attached to the opposite end of the nanorod; and
wherein the polymer is attached to the first linker.

16. The pin of claim 15,
wherein the polymer is grown from the first linker.

17. The pin of claim 15,
wherein the polymer is directly attached to the first linker.

18. A pin comprising
a nanorod,
a first linker, and
an attached member;
wherein the first linker is attached to a first end of the nanorod and the first linker is not attached to the opposite end of the nanorod,
wherein the volume of the attached member is approximately between 6000 cubic nanometers and 500 cubic micrometers, and
wherein the attached member comprises a polymer.

19. The pin of claim 18,
wherein the width of the attached member in the direction perpendicular to the nanorod is greater than approximately 100 nm.

* * * * *